US008565329B2

(12) United States Patent
Papadopoulos et al.

(10) Patent No.: US 8,565,329 B2
(45) Date of Patent: Oct. 22, 2013

(54) SOFT OUTPUT M-ALGORITHM RECEIVER STRUCTURES WITH GENERALIZED SURVIVOR SELECTION CRITERIA FOR MIMO SYSTEMS

(75) Inventors: Haralabos Papadopoulos, San Jose, CA (US); Carl-Erik W. Sundberg, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 874 days.

(21) Appl. No.: 12/476,066

(22) Filed: Jun. 1, 2009

(65) Prior Publication Data
US 2009/0296842 A1 Dec. 3, 2009

Related U.S. Application Data

(60) Provisional application No. 61/058,456, filed on Jun. 3, 2008.

(51) Int. Cl.
*H04L 1/06* (2006.01)
(52) U.S. Cl.
USPC .......................................... 375/267
(58) Field of Classification Search
USPC .......... 370/210, 310, 328, 331, 336; 375/260, 375/261, 267, 299, 340, 341, 347; 455/69, 455/446, 501, 522; 714/755, 775, 792, 794, 714/796
See application file for complete search history.

(56) References Cited

U.S. PATENT DOCUMENTS

| 5,903,842 | A | 5/1999 | Wang et al. |
| 5,982,327 | A | 11/1999 | Vook et al. |
| 6,182,264 | B1 | 1/2001 | Ott |
| 6,629,287 | B1 | 9/2003 | Brink |

(Continued)

FOREIGN PATENT DOCUMENTS

| EP | 1162750 A2 | 12/2001 |
| EP | 1383246 A2 | 1/2004 |

(Continued)

OTHER PUBLICATIONS

US Office Action for U.S. Appl. No. 11/644,638, dated Sep. 30, 2010, 24 pages.

(Continued)

*Primary Examiner* — Sam K Ahn
*Assistant Examiner* — Shawkat M Ali
(74) *Attorney, Agent, or Firm* — Blakely, Sokoloff, Taylor & Zafman LLP

(57) ABSTRACT

A method and apparatus is disclosed herein for a modified soft output M-algorithm. In one embodiment, the soft output M-algorithm is employed by a receiver in a wireless communication system to receive information-bearing signals wirelessly transmitted from the transmitter wirelessly transmitted, the receiver comprising: an inner decoder structure having a multiple-in multiple-out (MIMO) joint demapper to perform joint inner demapping over each tone, the joint demapper being operable to apply a soft-output M-type algorithm to identify survivor candidates at each depth in a detection tree being searched for each tone, including surviving full-length candidates, based on at least one metric and at least one other criterion, where a number of best alternatives from every level of the tree are expanded along with one or more alternatives selected meeting the at least one other criterion and where soft-output related information is collected and stored for each bit, and an outer decoder operable with the inner decoder to perform iterative decoding.

25 Claims, 12 Drawing Sheets

PERFORM A FIRST DECODING OPERATION TO PRODUCE A FIRST SET OF OUTPUT DATA REPRESENTING MOST LIKELY TRANSMITTED BIT ESTIMATION VALUES AND INFORMATION ABOUT THE RELIABILITY OF EACH OF THESE ESTIMATES, INCLUDING PERFORMING A DETECTION PROCESS OVER EACH TONE FOR JOINT INNER DEMAPPING, BY APPLYING A SOFT-OUTPUT M-TYPE ALGORITHM TO IDENTIFY SURVIVOR CANDIDATES AT EACH DEPTH IN A DETECTION TREE BEING SEARCHED FOR EACH TONE, INCLUDING SURVIVING FULL-LENGTH CANDIDATES, BASED ON AT LEAST ONE METRIC AND AT LEAST ONE OTHER CRITERIA, WHERE A NUMBER OF BEST ALTERNATIVES FROM EVERY LEVEL OF THE TREE ARE EXPANDED ALONG WITH ONE OR MORE ALTERNATIVES SELECTED MEETING THE AT LEAST ONE OTHER CRITERIA AND WHERE SOFT-OUTPUT RELATED INFORMATION IS COLLECTED AND STORED FOR EACH BIT
102

COMPARE A SOFT OUTPUT VALUE FOR EACH BIT BY COMPARING A METRIC OF A PARTIAL PATH FROM AN ESTIMATED BEST PATH WITH THE METRIC OF THE LONGEST AND BEST VISITED PATH WITH AN OPPOSITE DECISION ON THAT BIT
103

(56) References Cited

U.S. PATENT DOCUMENTS

| | | |
|---|---|---|
| 6,804,307 B1 | 10/2004 | Popovic |
| 6,862,552 B2 | 3/2005 | Goldstein et al. |
| 6,901,117 B1 | 5/2005 | Classon et al. |
| 6,976,087 B1 | 12/2005 | Westfall et al. |
| 7,042,856 B2 | 5/2006 | Walton et al. |
| 7,042,858 B1 | 5/2006 | Ma et al. |
| 7,072,295 B1 | 7/2006 | Benson et al. |
| 7,095,812 B2 | 8/2006 | Chan et al. |
| 7,251,369 B2 | 7/2007 | Nakaya |
| 7,308,047 B2 | 12/2007 | Sadowsky |
| 7,310,369 B1 | 12/2007 | Krieger et al. |
| 7,436,895 B1 | 10/2008 | Tujkovic |
| 7,441,045 B2 | 10/2008 | Skene et al. |
| 7,444,347 B1 | 10/2008 | Alley et al. |
| 7,564,915 B2 | 7/2009 | Lee et al. |
| 7,620,117 B2 | 11/2009 | Chae et al. |
| 7,877,097 B2 | 1/2011 | Zhu et al. |
| 7,877,108 B2 | 1/2011 | Wengerter et al. |
| 8,027,407 B2 | 9/2011 | Papadopoulos |
| 8,042,031 B2 | 10/2011 | Chen et al. |
| 2002/0114404 A1 | 8/2002 | Aizawa et al. |
| 2002/0118781 A1 | 8/2002 | Thomas et al. |
| 2002/0176431 A1 | 11/2002 | Golla et al. |
| 2003/0002505 A1 | 1/2003 | Hoch et al. |
| 2003/0072254 A1 | 4/2003 | Ma et al. |
| 2003/0235149 A1* | 12/2003 | Chan et al. .................. 370/206 |
| 2003/0236080 A1 | 12/2003 | Kadous |
| 2004/0013180 A1 | 1/2004 | Giannakis et al. |
| 2004/0022179 A1 | 2/2004 | Giannakis et al. |
| 2004/0042400 A1 | 3/2004 | Horlin et al. |
| 2004/0116146 A1 | 6/2004 | Sadowsky et al. |
| 2004/0165675 A1 | 8/2004 | Ito et al. |
| 2004/0205445 A1 | 10/2004 | Xu |
| 2005/0010675 A1 | 1/2005 | Jaggi |
| 2005/0041751 A1 | 2/2005 | Nir et al. |
| 2005/0047514 A1 | 3/2005 | Bolinth et al. |
| 2005/0068918 A1 | 3/2005 | Mantravadi et al. |
| 2005/0111592 A1 | 5/2005 | Yee |
| 2005/0152391 A1 | 7/2005 | Effros et al. |
| 2005/0185707 A1 | 8/2005 | Hoo et al. |
| 2005/0220040 A1 | 10/2005 | Petrovic et al. |
| 2005/0265280 A1 | 12/2005 | Roh et al. |
| 2006/0002312 A1 | 1/2006 | Delattre et al. |
| 2006/0020560 A1 | 1/2006 | Rodriguez et al. |
| 2006/0029124 A1 | 2/2006 | Grant et al. |
| 2006/0039489 A1 | 2/2006 | Ikram et al. |
| 2006/0098760 A1 | 5/2006 | Shen et al. |
| 2006/0146716 A1 | 7/2006 | Lun et al. |
| 2006/0146791 A1 | 7/2006 | Deb |
| 2006/0148506 A1 | 7/2006 | Hoo |
| 2006/0152391 A1 | 7/2006 | Sakuyama |
| 2006/0176945 A1 | 8/2006 | Li |
| 2006/0276217 A1 | 12/2006 | Khojastepour et al. |
| 2007/0041475 A1 | 2/2007 | Koshy et al. |
| 2007/0066229 A1 | 3/2007 | Zhang et al. |
| 2007/0121499 A1 | 5/2007 | Pal et al. |
| 2007/0156919 A1 | 7/2007 | Potti et al. |
| 2007/0198899 A1 | 8/2007 | Yellin et al. |
| 2007/0213013 A1* | 9/2007 | Kim ................................. 455/69 |
| 2007/0223423 A1 | 9/2007 | Kim et al. |
| 2007/0281633 A1 | 12/2007 | Papadopoulos |
| 2007/0286313 A1 | 12/2007 | Nikopour-Deilami et al. |
| 2008/0025430 A1 | 1/2008 | Sadowsky |
| 2008/0032630 A1 | 2/2008 | Kim et al. |
| 2008/0075022 A1 | 3/2008 | Lei et al. |
| 2008/0092028 A1 | 4/2008 | Orio |
| 2008/0101310 A1 | 5/2008 | Marzetta |
| 2008/0123781 A1 | 5/2008 | Pisek et al. |
| 2008/0181339 A1 | 7/2008 | Chen et al. |
| 2008/0212526 A1 | 9/2008 | Oyman |
| 2009/0082054 A1 | 3/2009 | Li et al. |
| 2009/0213954 A1 | 8/2009 | Bursalioglu et al. |
| 2009/0225878 A1 | 9/2009 | Papadopoulos et al. |
| 2009/0268684 A1 | 10/2009 | Lott et al. |
| 2009/0285323 A1 | 11/2009 | Sundberg et al. |
| 2009/0291699 A1 | 11/2009 | Heath et al. |
| 2009/0296842 A1 | 12/2009 | Papadopoulos et al. |

FOREIGN PATENT DOCUMENTS

| | | |
|---|---|---|
| EP | 1411693 A2 | 4/2004 |
| EP | 1521386 A2 | 4/2005 |
| EP | 1530387 A1 | 5/2005 |
| EP | 1648097 A | 4/2006 |
| EP | 1648097 A2 | 4/2006 |
| EP | 1827040 A1 | 8/2007 |
| EP | 1863208 A1 | 12/2007 |
| GB | 2304495 | 3/1997 |
| GB | 2407007 A | 4/2005 |
| KR | 1020060063478 A | 6/2006 |
| WO | WO 01/43293 A1 | 6/2001 |
| WO | WO 2004/045167 A | 5/2004 |
| WO | WO 2004/025011 A | 7/2004 |
| WO | WO 2004/056011 A1 | 7/2004 |
| WO | WO 2005/046081 A1 | 5/2005 |
| WO | WO 2006/029050 A | 3/2006 |
| WO | WO 2007/050860 A1 | 5/2007 |
| WO | WO 2007/073267 A1 | 6/2007 |
| WO | WO 2007/087540 A2 | 8/2007 |
| WO | WO 2007/129990 A1 | 11/2007 |
| WO | WO 2008/057791 A1 | 5/2008 |
| WO | WO 2008/143973 A1 | 11/2008 |
| WO | WO 2009/033023 A2 | 3/2009 |
| WO | WO 2010/019618 A2 | 2/2010 |

OTHER PUBLICATIONS

Korean Office Action for corresponding Korean Patent Application No. 2008-7025123, dated Sep. 29, 2010, 3 Pgs.

PCT International Preliminary Report on Patentability for PCT Patent Application No. PCT/US2009/035735, dated Sep. 16, 2010, 8 pages.

European Office Action for corresponding European Patent Application No. 07861675.2, dated Jul. 26, 2010, 4 pgs.

US Office Action for U.S. Appl. No. 11/754,903, dated Sep. 20, 2010, 18 pages.

US Office Action for U.S. Appl. No. 11/939,353, dated Sep. 22, 2010, 15 pages.

US Office Action for U.S. Appl. No. 12/040,653, dated Dec. 11, 2009, 33 pages.

PCT International Preliminary Report on Patentability for PCT Patent Application No. PCT/US2008/003274, dated Sep. 24, 2009, 10 pages.

PCT International Search Report for PCT Patent Application No. PCT/US2007/013074, dated Dec. 2, 2009, 8 pgs.

Written Opinion of the International Searching Authority for PCT Patent Application No. PCT/US2009/046014, dated Nov. 27, 2009, 8 pgs.

Stiglmayr, Stephan, et al., "Adaptive Coding and Modulation in OFDM Systems using BICM and Rate-Compatible Punctured Codes", 7 pages.

G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, Md, USA, Mar. 2005.

Yiu, S., et al., "Distritbuted Space-Time Block Coding for Cooperative Networks With Multiple Antenna Nodes", Computational Advances in Multi-Sensor Adaptive Processing, Dec. 13, 2005, pp. 52-55.

Yiu, Simon, et al., "Optimization of Distributed Space-Time Filtering", IEEE 62nd Vehicular Technology Conference, Sep. 2005, pp. 1829-1833, Piscataway, New Jersey, USA.

Adachi, Koichi, et al., "Iterative Modified QRD-M Based on CRC Codes for OFDM MIMO Multiplexing", IEICE Transactions on Communications, Jun. 1, 2007, pp. 1433-1443, vol. E90B, No. 6, Tokyo, Japan.

(56) References Cited

OTHER PUBLICATIONS

Detert, Thorben, "An Efficient Fixed Complexity QRD-Algorithm for MIMO-OFDM using Per-Survivor Slicing", IEEE 4th International Symposium on Wireless Communications Systems, Oct. 1, 2007, pp. 572-576, Piscataway, New Jersey, USA.
US Final Office Action for U.S. Appl. No. 11/873,248, dated Sep. 1, 2010, 21 pages.
US Office Action for U.S. Appl. No. 11/939,353 dated Jan. 31, 2011, 15 pages.
Sen, et al., "Cute and jCUTE Concolic Unit Testing and Explicit Path Model-Checking Tool", Computer Aided Verification Lecture Notes in Computer Science, Jan. 1, 2006, pp. 419-423.
Majumdar, et al., "Hybrid Concolic Testing", IEEE 29th International Conference on Software Engineering, May 1, 2007, pp. 416-426.
PCT International Preliminary Report on Patentability for PCT Patent Application No. PCT/US2009/046014, dated Dec. 16, 2010, 9 pages.
PCT International Search Report for PCT Patent Application No. PCT/US2010/033549, Jan. 5, 2011, 5 pgs.
PCT Written Opinion of the International Searching Authority for PCT Patent Application No. PCT/US2010/033549, Jan. 5, 2011, 6 pgs.
European Office Action for European Patent Application No. 08767750.6, dated Jan. 12, 2011, 6 pgs.
PCT International Search Report for PCT Patent Application No. PCT/US2010/027139, Dec. 6, 2010, 5 pgs.
PCT Written Opinion of the International Searching Authority for PCT Patent Application No. PCT/US2010/027139, Dec. 6, 2011, 6 pgs.
European Office Action for European Patent Application No. 08767751.4, Jan. 14, 2011, 5 pgs.
US Office Action for U.S. Appl. No. 11/644,638, dated Sep. 22, 2009, 13 pages.
PCT International Preliminary Report on Patentability for PCT Patent Application No. PCT/US2007/013074, dated Dec. 30, 2009, 8 pages.
PCT International Search Report for PCT Patent Application No. PCT/US2008/006287, dated Oct. 2, 2008, 6 pgs.
Written Opinion of the International Searching Authority for PCT Patent Application No. PCT/US2008/006287, dated Oct. 2, 2008, 7 pgs.
PCT International Preliminary Report on Patentability for PCT Patent Application No. PCT/US2008/065675, dated Dec. 17, 2009, 8 pages.
PCT International Search Report for PCT Patent Application No. PCT/US2009/054937, dated Dec. 30, 2009, 7 pgs.
Written Opinion of the International Searching Authority for PCT Patent Application No. PCT/US2009/054937, dated Dec. 30, 2009, 7 pgs.
Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.
PCT International Search Report for PCT Patent Application No. PCT/US2009/56865, dated Mar. 2, 2010, 7 pgs.
Written Opinion of the International Searching Authority for PCT Patent Application No. PCT/US2009/56865, dated Mar. 2, 2010, 12 pgs.
PCT International Search Report for PCT Patent Application No. PCT/US2009/034758, dated Feb. 4, 2010, 7 pgs.
Written Opinion of the International Searching Authority for PCT Patent Application No. PCT/US2009/034758, dated Feb. 4, 2010, 7 pgs.
Sun, Sumei, et al., "Pseudo-Inverse MMSE Based QRD-M Algorithm for MIMO OFDM", Jan. 1, 2006, pp. 1545-1549, vol. 3.
Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.
US Office Action for U.S. Appl. No. 12/538,733, Oct. 18, 2011, 11 pgs.

US Office Action for U.S. Appl. No. 12/538,739, Dec. 7, 2011, 23 pgs.
US Final Office Action for U.S. Appl. No. 12/538,733, Mar. 27, 2012, 6 pgs.
US Final Office Action for U.S. Appl. No. 12/335,409, Mar. 19, 2012, 22 pgs.
US Office Action for U.S. Appl. No. 12/335,389, Apr. 12, 2012, 20 pgs.
PCT International Preliminary Report on Patentability for PCT Patent Application No. PCT/US2010/033549, Nov. 17, 2011, 7 pgs.
US Notice of Allowance for U.S. Appl. No. 11/754,903, Mar. 12, 2012, 8 pgs.
US Final Office Action for U.S. Appl. No. 12/209,110, dated Jul. 14, 2011, 26 pgs.
US Office Action for U.S. Appl. No. 12/335,409, dated Aug. 16, 2011, 20 pgs.
US Notice of Allowance for U.S. Appl. No. 11/664,638, dated Jun. 9, 2011, 10 pgs.
US Office Action for U.S. Appl. No. 11/754,903, dated Jun. 6, 2011, 11 pgs.
Papadogiannis, et al., "A Dynamic Clustering Approach in Wireless Networks with Multi-Cell Cooperative Processing", IEEE International Conference on Communications, May 19, 2008, pp. 4033-4037.
PCT International Preliminary Report on Patentability for PCT Patent Application No. PCT/US2009/053466, dated Feb. 24, 2011, 9 pages.
PCT International Preliminary Report on Patentability for PCT Patent Application No. PCT/US2009/053471, dated Feb. 24, 2011, 9 pages.
PCT International Preliminary Report on Patentability for PCT Patent Application No. PCT/US2009/054937, dated Mar. 10, 2011, 8 pages.
PCT International Preliminary Report on Patentability for PCT Patent Application No. PCT/US2009/056865, dated Mar. 24, 2011, 12 pgs.
European Office Action for European Patent Application No. 07862325.3, Apr. 7, 2011, 6 pgs.
Michalke, Clemens, et al., "Linear Momo Receivers vs. Tree Search Detection: A Performance Comparison Overview", IEEE Internatinal Symposium on Personal, Indoor and Mobile Radio Communications, Sep. 11, 2006, pp. 1-7.
Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
US Final Office Action for U.S. Appl. No. 11/644,638, dated Apr. 29, 2010, 22 pages.
Korean Office Action for corresponding Korean Patent Application No. 2008-7023249, dated May 27, 2010, 4 Pgs.
European Office Action for corresponding European Patent Application No. 07862325.3, dated Jul. 6, 2010, 6 pgs.
PCT International Search Report for PCT Patent Application No. PCT/US2009/053472, dated Jun. 14, 2010, 7 pgs.
Written Opinion of the International Searching Authority for PCT Patent Application No. PCT/US2009/053472, dated Jun. 14, 2010, 5 pgs.
US Final Office Action for U.S. Appl. No. 12/040,653, dated Jun. 15, 2010, 40 pages.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.

(56) References Cited

OTHER PUBLICATIONS

International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
International Search Report dated Apr. 17, 2009 for PCT/US2008/076252, 5 pages.
Written Opinion of the International Searching Authority dated Apr. 17, 2008 for PCT/US2008/076252, 9 pages.
Written Opinion of the International Searching Authority dated Apr. 30, 2009 for PCT/US2007/022189, 8 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.
Chindapol, Aik, et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.
Alamouti, Siavash M., "A Simple Transmit Diversity Technique for Wireless Communications", IEEE Journal on Select Areas in Communications, vol. 16, No. 8, Oct. 1998, pp. 1451-1458.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.
Lee, Inkyu, et al., "Space-Time Bit-Interleaved Coded Modulation for OFDM Systems", IEEE Transactions on Signal Processing, vol. 52, No. 3, Mar. 2004, pp. 820-825.
Lee, Heunchul, et al., "A Flexible Space-Time Coding System with Unequal Error Protection", IEEE, 2005, 5 pages.
Lee, Inkyu, et al., "Reduced-Complexity Receiver Structures for Space-Time Bit-Interleaved Coded Modulation Systems", IEEE Transactions on Communications, vol. 55, No. 1, Jan. 2007, pp. 142-150.
Lee, Inkyu, et al., "Code Construction for Space-Time Bit-Interleaved Coded Modulation Systems", IEEE Communications Society, 2004, 5 pages.
Li, Xiaodong, et al., "Bit-Interleaved Coded Modulation with Iterative Decoding and 8PSK Signaling", IEEE Transactions on Communications, vol. 50, No. 8, Aug. 2002, pp. 1250-1257.
Lee, Inkyu, et al., "Code Design of Space-Time Bit-Interleaved Coded Modulation Systems for Maximum Diversity", ICC, Jun. 2004, 11 pages.
Taddei, Herve, et al., Mode Adaptive Unequal Error Protection for Transform Predictive Speech and Audio Coders, IEEE, 2002, pp. 165-168.
Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.
Wong, K., "The Soft-Output M-Algorithm and Its Applications", PhD Thesis, Queens University, Kingston, Canada, Aug. 2006, 263 pages.
Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.
Seshadri, N., et al., "List Viterbi Decoding Algorithms with Applications", IEEE Transactions on Communications, vol. 42, No. 2/3/4, Feb./Mar./Apr. 1994, pp. 313-323.
Taoka, H., et al., "Field Experiments on Ultimate Frequency Efficicncy Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.
Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.
Wong, K.K.Y., et al., "Low-complexity space-time turbo equalizer with the soft-output M-algorithm for frequency-selective channels", IEEE International Conference on Communications, vol. 4, May 2005, pp. 2251-2255.
Wong, K.K.Y., et al., "Bi-directional soft-output m-algorithm for iterative decoding", IEEE International Conference on Communications, vol. 2, Jun. 2004, pp. 792-797.
Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.
Papadopoulos, H., et al., "Wideband space-time coded systems with non-collocated antennas", Radio and Wireless Symposium, 2008 IEEE, Jan. 22, 2008, pp. 307-310.
Lee, Inkyu, et al., "Diversity Analysis for Space-Time, Bit-Interleaved Coded Modulation Systems", Korea University, Seoul, Korea, Jan. 2007.
Gencata, et al., "Virtual-topology adaptation for WDM mesh networks under dynamic traffic," Proceedings of IEEE Infocom 2002, vol. 1, Jun. 23, 2002, pp. 48-56.
Koetter, R., et al., "Beyond routing: an algebraic approach to network coding," Proceedings of IEEE Infocom 2002, vol. 1, Jun. 23, 2002, pp. 122-130.
Del Re, Enrico, et al., "Next-Generation Mobile Satellite Networks," IEEE Communications Magazine, vol. 40, No. 9, Sep. 1, 2002, pp. 150-159.
Ernest, P.H.H., et al., "An efficient algorithm for virtual topology reconfiguration in WDM optical ring networks," Proceedings of 10th Conference on Computer Communications and Networks, Oct. 15, 2001, pp. 55-60.
Fasolo, E., "Network coding techniques," www.cs.virginia.edu/{yw5s/Network%20coding.ppt, Mar. 7, 2004, pp. 1-14.
Chou, P.A., et al., "Network Coding for the Internet and Wireless Networks", www.eecs.umich.edu/systems/ChouSeminar.ppt, Mar. 28, 2006, pp. 1-29.
Ahlswede, R., et al., "Network Information Flow", IEEE Transactions on Information Theory, IT-46(4), Jul. 2000, pp. 1204-1216.
Ho, T., et al., "The Benefits of Coding Over Routing in a Randomized Setting", in the Proceedings of the International Symposium on Information Theory (ISIT), Jun. 2003, pp. 1-6.
Katti, S., et al., "XORs in the Air: Practical Wireless Network Coding", in the Proceedings of the ACM Special Interest Group on Data Communication (SIGCOMM), Sep. 2006, 12 pages.
Koetter, R., et al., "An Algebraic Approach to Network Coding", IEEE/ACM Transactions on Networking, vol. 11, No. 5, Oct. 2003, pp. 782-795.
Li, S. R., et al., "Linear Network Coding", IEEE Transactions on Information Theory, IT-49(2), Feb. 2003, pp. 371-381.
Chou, P.A., et al., "Practical Network Coding", 51st Allerton Conference on Communication, Control and Computing, Oct. 2003, 10 pages.
Cormen, T.H., et al., "Introduction to Algorithms", 2nd Edition, MIT Press and McGraw-Hill, 2001, pp. 643-700.

(56) References Cited

OTHER PUBLICATIONS

Jafarkani, H., "Space-Time Coding, Theory and Practice", Cambridge University Press, 2005.
Yiu, S., et al., "Distributed Block Source Coding", IEEE Globecom 2005 Proceedings, Nov. 2005.
Su, W., et al., "Signal Constellations for Quasi-Orthogonal Space-Time Block Codes with Full Diversity", IEEE Transactions on Information Theory, Oct. 2004, pp. 2231-2347.
Jafarkani, H., "A Quasi-Orthogonal Space-Time Block Code", IEEE Transactions on Communications, Jan. 2001, 4 pages.
Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.
Sharma, N. et al.: "Improved Quasi-Orthogonal Codes Through Constellation Rotation," IEEE Trans. Communications, pp. 332-335, Mar. 2003, 3 pages.
Wang, H. et al.: "Upper Bounds of Rates of Space-Tame Block Codes from Complex Orthogonal Designs," IEEE Trans. Information Theory, pp. 2788-2796, Oct. 2003, 9 pages.
El Gamal, H. et al., "Distributed Space-Time Filtering for Cooperative Wireless Networks", Globecom'03, Dec. 2003, pp. 1826-1830.
Sezgin, A., et al., "On Exit-Chart Analysis of Coherent and Non-Coherent Space-Time Codes", Smart Antennas, 2004, pp. 49-56.
Horn, R.A., et al., "Matrix Analysis", Cambridge University Press, New York, 1994.
Tse, D., et al., "Fundamentals of Wireless Communication", Cambridge University Press, May 2005.
Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.
Guerin, R., et al., "Quality-of-Service in Packet Networks: Basic Mechanisms and Directions", Invited Paper, Computer Networks, vol. 31, No. 3, Feb. 1999, pp. 1-16.
Zhang, H., "Service Disciplines for Guaranteed Performance Service in Packet-Switching Networks", in the Proceedings of the IEEE, vol. 83, No. 10, Oct. 1995, pp. 1-23.
Caire, G., et al., "Achievable Throughput of MIMO Downlink Beamforming and Limited Channel Information", Proceedings of IEEE PIMRC, Aug. 2007.
Medard, M., "The Effect upon Channel Capacity in Wireless Communication of Imperfect Knowledge of the Channel", IEEE Transactions on Information Theory, May 2000, pp. 935-945.
Marzetta, T.L., "How Much Training Is Required for Multi-User MIMO?", ACSSC96, Asilomar Conference Oct. 2006.
Viswanath, P., et al., "Sum Capacity of the Multiple Antenna Gaussian Broadcast Channel and Uplink-Downlink Duality", IEEE Transactions on Information Theory, Aug. 2003, pp. 1912-1923.
Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.
Joham, M., et al., "Linear Transmit Processing in MIMO Communications Systems", IEEE Transactions on Signal Processing, Aug. 2005, pp. 2700-2712.
Osseiran, A., The Winner II Air Interface: Refined Spatial-Temporal Processing Solutions, Online Citation <https://www.ist.-winner.org/WINNER2-Deliverables/D3.4.1.pdf>, Jan. 1, 2007, pp. 1-148.
Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.
Catt, "Non-codebook based pre-coding for E-UTRA TDD Downlink", 3rd Generation Partnership Project, Oct. 4, 2006, pp. 1-3.
Gomadam, K.S., et al., "Techniques for Multi-user MIMO with Two-way Training", IEEE International Conference on Communications, May 19, 2008, pp. 3360-3366.
US Office Action for U.S. Appl. No. 12/209,110 dated Feb. 11, 2011, 20 pages.

US Office Action for U.S. Appl. No. 12/121,649, Apr. 19, 2011, 25 pgs.
US Office Action for U.S. Appl. No. 12/130,821, Feb. 22, 2011, 12 pgs.
US Office Action for U.S. Appl. No. 12/121,634, Mar. 1, 2011, 19 pgs.
US Office Action for U.S. Appl. No. 11/644,638, Apr. 15, 2011, 7 pgs.
European Office Action for European Patent Application No. 09718026.9, Feb. 10, 2011, 3 pgs.
European Office Action for European Patent Application No. 08756664.2, Mar. 17, 2011, 6 pgs.
US Office Action for U.S. Appl. No. 11/873,248, dated Mar. 31, 2010, 18 pages.
Korean Office Action for corresponding Korean Patent Application No. 2008-7025915, dated Feb. 9, 2010.
PCT International Preliminary Report on Patentability for PCT Patent Application No. PCT/US2008/076252, dated Apr. 1, 2010, 9 pages.
PCT International Preliminary Report on Patentability for PCT Patent Application No. PCT/US2008/073646, dated Mar. 4, 2010, 6 pages.
Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.
US Notice of Allowance for U.S. Appl. No. 12/538,733, dated Apr. 26, 2012, 6 pgs.
US Notice of Allowance for U.S. Appl. No. 12/335,409, dated Jul. 19, 2012, 8 pgs.
US Office Action for U.S. Appl. No. 12/546,471, dated May 21, 2012, 11 pgs.
US Office Action for U.S. Appl. No. 12/209,110, dated Jun. 12, 2012, 39 pgs.
US Notice of Allowance for U.S. Appl. No. 11/644,638, dated Jun. 9, 2011, 11 pgs.
US Notice of Allowance for U.S. Appl. No. 12/121,634, dated Aug. 12, 2011, 9 pgs.
Li, et al., "Full Diversity Distributed Space-Time Trellis Codes for Asynchronous Cooperative Communications", Proceeding of the IEEE 2005 International Symposium on Information Theory, Sep. 4, 2005, 6 pgs., Adelaide, South Australia, Australia.
Jing, et al., "Distributed Space-Time Codes in Wireless Relay Networks", 2004 IEEE Sensor Array and Multichannel Signal Processing Workshop, Jul. 21, 2004, pp. 249-253.
Japanese Office Action for related Japanese Patent Application No. 2009-513327, Aug. 7, 2012, 3 pgs.
PCT International Search Report for PCT Patent Application No. PCT/US2009/046014, dated Nov. 27, 2009, 7 pgs.
Written Opinion of the International Searching Authority for PCT Patent Application No. PCT/US2007/013074, dated Dec. 2, 2009, 8 pgs.
US Office Action for U.S. Appl. No. 11/754,903, dated Mar. 29, 2010, 11 pages.
PCT International Search Report for PCT Patent Application No. PCT/US2009/053471, Dec. 15, 2009, 7 pgs.
PCT Writen Opinion of the International Searching Authority for PCT Patent Application No. PCT/US2009/053471, Dec. 15, 2009, 9 pgs.
PCT International Preliminary Report on Patentability for PCT Appl. No. PCT/US2009/034758, Aug. 31, 2010, 6 pgs.
PCT International Preliminary Report on Patentability for PCT Appl. No. PCT/US2009/046014, Dec. 6, 2010, 7 pgs.
PCT International Search Report for PCT Patent Application No. PCT/US2009/046014, Nov. 27, 2009, 3 pgs.
PCT Writen Opinion of the International Searching Authority for PCT Patent Application No. PCT/US2009/046014, Nov. 27, 2009, 6 pgs.
PCT International Preliminary Report on Patentability for PCT Appl. No. PCT/US2009/053472, Feb. 15, 2011, 5 pgs.
European Office Action for European Patent Application No. 09715574.1, Jan. 11, 2012, 6 pgs.
European Office Action for European Patent Application No. 08832132.8, Feb. 10, 2012, 5 pgs.

(56) References Cited

OTHER PUBLICATIONS

US Office Action for U.S. Appl. No. 12/700,585, dated Oct. 15, 2012, 9 pgs.

US Final Office Action for U.S. Appl. No. 12/209,110, dated Dec. 28, 2012, 40 pgs.

US Final Office Action for U.S. Appl. No. 12/538,739, dated Aug. 3, 2012, 35 pgs.

US Office Action for U.S. Appl. No. 12/546,471, dated Dec. 26, 2012, 11 pgs.

US Office Action for U.S. Appl. No. 12/558,367, dated Feb. 15, 2013, 13 pgs.

US Office Action for U.S. Appl. No. 12/772,717, dated Feb. 13, 2013, 11 pgs.

Taddei, Herve, et al., "Mode Adaptive Unequal Error Protection for Transform Predictive Speech and Audio Coders", Proceedings of the IEEE International Conference in Acoustics, Speech, and Signal Processing (ICASSP 2002), vol. I, pp. 865-868, May 2002.

Marsch, Patrick, et al., On multicell cooperative transmission in backhaul-constrained cellular systems, Annals of Telecommunications, May 1, 2008, pp. 253-269, vol. 63, No. 5/6.

Lang, Yidong, et al., "A Novel Resource Allocation Strategy for Distributed MIMO Multi•Hop Multi-Commodity Communications", JEEE International ITG Workshop on Smart Antennas, Feb. 26, 2008, pp. 125-132.

Karakayali, M., et al., "On the Maximum Common Rate Achievable in a Coordinated Network", Mar. 3, 2006, 6 pages.

Caire, G., et al., "Multiuser MIMO Downlink with Limited Inter-Cell Cooperation: Approximate Interference Alignment in Time, Frequency, and Space", 8 pages, 2008.

Boccardi, F., et al., "Limited Downlink Network Coordination in Cellular Networks", The 18th Annual IEEE International Symposium on Personal, Indoor, and Mobile Radio Communications (PIMRC '07), 5 pages, 2007.

Caire, G., et al., "Multiuser MIMO Achievable Rates with Downlink Training and Channel State Feedback", 31 pages, 2007.

Caire, G., et al., "On the Achievable Throughput of a Multiantenna Gaussian Broadcast Channel", IEEE Transactions on Information Theory, vol. 49, No. 7, Jul. 2003, pp. 1691-1706.

Ernesto Zimmermann, "Complexity Aspects in Near-Capacity MIMO Detection-Decoding", Jan. 1, 2007, pp. 39-70.

Ernesto Zimmermann, et al., "Unbiased MMSE Tree Search Detection for Multiple Antenna Systems", Proceedings of the International Symposium on Wireless Personal Multimedia Communications, Sep. 1, 2006, pp. 806-810.

* cited by examiner

PERFORM A FIRST DECODING OPERATION TO PRODUCE A FIRST SET OF OUTPUT DATA REPRESENTING MOST LIKELY TRANSMITTED BIT ESTIMATION VALUES AND INFORMATION ABOUT THE RELIABILITY OF EACH OF THESE ESTIMATES, INCLUDING PERFORMING A DETECTION PROCESS OVER EACH TONE FOR JOINT INNER DEMAPPING, BY APPLYING A SOFT-OUTPUT M-TYPE ALGORITHM TO IDENTIFY SURVIVOR CANDIDATES AT EACH DEPTH IN A DETECTION TREE BEING SEARCHED FOR EACH TONE, INCLUDING SURVIVING FULL-LENGTH CANDIDATES, BASED ON AT LEAST ONE METRIC AND AT LEAST ONE OTHER CRITERIA, WHERE A NUMBER OF BEST ALTERNATIVES FROM EVERY LEVEL OF THE TREE ARE EXPANDED ALONG WITH ONE OR MORE ALTERNATIVES SELECTED MEETING THE AT LEAST ONE OTHER CRITERIA AND WHERE SOFT-OUTPUT RELATED INFORMATION IS COLLECTED AND STORED FOR EACH BIT
102

COMPARE A SOFT OUTPUT VALUE FOR EACH BIT BY COMPARING A METRIC OF A PARTIAL PATH FROM AN ESTIMATED BEST PATH WITH THE METRIC OF THE LONGEST AND BEST VISITED PATH WITH AN OPPOSITE DECISION ON THAT BIT
103

| 0-value Table | | | | 1-value Table | | | | Ordered Paths | Survivor? |
|---|---|---|---|---|---|---|---|---|---|
|  |  |  |  |  |  |  |  | - | - |
|  |  |  |  | X | X | X | X | 1111 | Yes |
|  |  |  | X |  |  |  |  | 1110 | Yes |
|  |  | X |  |  |  |  |  | 1101 | Yes |
|  |  |  |  |  |  |  |  | 1100 | No |
|  | X |  |  |  |  |  |  | 1011 | Yes |
|  |  |  |  |  |  |  |  | 1010 | No |
|  |  |  |  |  |  |  |  | 1001 | No |
|  |  |  |  |  |  |  |  | 1000 | No |
| X |  |  |  |  |  |  |  | 0111 | Yes |
|  |  |  |  |  |  |  |  | 0110 | No |

FIG. 13

| 0-value Table | | | | 1-value Table | | | | Ordered Paths | Survivor? |
|---|---|---|---|---|---|---|---|---|---|
| 0 | 0 | 0 | 0 | 0 | 0 | 0 | 0 | - | - |
| 0 | 0 | 0 | 0 | 1 | 1 | 1 | 1 | 1111 | Yes |
| 0 | 0 | 0 | 1 | 2 | 2 | 2 | 1 | 1110 | Yes |
| 0 | 0 | 1 | 1 | 3 | 3 | 2 | 2 | 1101 | Yes |
| 0 | 0 | 2 | 2 | 4 | 4 | 2 | 2 | 1100 | Yes |
| 0 | 1 | 2 | 2 | 5 | 4 | 3 | 3 | 1011 | Yes |
| 0 | 2 | 2 | 3 | 6 | 4 | 4 | 3 | 1010 | Yes |
| 0 | 2 | 2 | 3 | 6 | 4 | 4 | 3 | 1001 | No |
| 0 | 2 | 2 | 3 | 6 | 4 | 4 | 3 | 1000 | No |
| 1 | 2 | 2 | 3 | 6 | 5 | 5 | 4 | 0111 | Yes |
| 2 | 2 | 2 | 4 | 6 | 6 | 6 | 4 | 0110 | Yes |

FIG. 14

SOFT OUTPUT M-ALGORITHM RECEIVER STRUCTURES WITH GENERALIZED SURVIVOR SELECTION CRITERIA FOR MIMO SYSTEMS

PRIORITY

The present patent application claims priority to and incorporates by reference the corresponding provisional patent application Ser. No. 61/058,456, titled, "Adaptive Soft Output Generalized M-Algorithm Receiver Structures for MIMO/OFDM/QAM Systems with BICM/ID," filed on Jun. 3, 2008.

FIELD OF THE INVENTION

Embodiments of the present invention relate to the field of adaptive reduced-complexity receiver structures for receiving information over wireless systems with multiple transmit antennas and multiple receive antennas; more particularly, embodiments of the present invention relates to inner/outer decoder structures with an optimal outer decoder and inner decoders based on a forward-backward version of the soft output M-algorithm are employed.

BACKGROUND OF THE INVENTION

Future wireless systems require efficient utilization of the radio frequency spectrum in order to increase the data rate achievable within a given transmission bandwidth. This can be accomplished by employing multiple transmit and receive antennas combined with signal processing. A number of recently developed techniques and emerging standards are based on employing multiple antennas at a base station to improve the reliability of data communication over wireless media without compromising the effective data rate of the wireless systems. So called space-time block-codes (STBCs) are used to this end. Specifically, recent advances in wireless communications have demonstrated that by jointly encoding symbols over time and transmit antennas at a base station, one can obtain reliability (diversity) benefits as well as increases in the effective data rate from the base station to each user. These multiplexing (throughput) gain and diversity benefits depend on the space-time coding techniques employed at the base station. The multiplexing gains and diversity benefits are also inherently dependent on the number of transmit and receive antennas in the system being deployed, in the sense that they are fundamentally limited by the multiplexing-diversity trade-offs curves that are dictated by the number of transmit and the number of receive antennas in the system.

For high data rates and wideband transmission the use of OFDM makes the equalizer unnecessary. With multilevel modems, coded modulation systems can easily be designed by use of an outer binary code, e.g., a convolutional code and an interleaver in a so called bit-interleaved coded modulation (BICM) system. One such class of systems employing BICM are MIMO/OFDM/BICM/ID systems. Such systems can also employ an inner orthogonal or quasi-orthogonal space-time block code, although typically they will not. Also, the transmit antennas need not be collocated, although, typically they are collocated.

A number of receiver structures exist as options for transmission systems. Many of these designs include an inner-outer decoder structure, whereby the outer decoder is optimally selected. The designs include iterative decoding (ID) receivers with a MAP-based inner decoder, ID systems with a MaxLogMAP-based inner decoder, receivers using QRD/M-Algorithm based inner decoder, MMSE-based inner decoders, tree-search based inner decoders based on conventional SOMA, on SOMA versions with tree reordering, and on forward-backward SOMA versions with tree ordering.

ID receivers that have a MAP-based inner decoder use the optimum inner decoder and have the optimum bit-error-rate performance among all inner/outer decoder structures. However, the MAP-based inner decoder becomes computationally intractable as the number of transmit antennas (which equals the number of QAM symbols that need to be jointly resolved), referred to herein as N, and the number of bits represented by each QAM symbol, referred to herein as B, increase.

ID systems with a MaxLogMAP-based inner decoder have less complexity than the MAP-based system and are asymptotically (high SNR) optimal in that they have near optimum bit-error-rate performance at high SNR. However, the MaxLogMAP-based inner decoder also becomes computationally intractable as N and B increase.

Systems with receivers using QRD/M-Algorithm based inner decoder also use a variant of the M-algorithm to produce hard bit estimates along with reliability information. They perform a limited tree-search whereby at every level of the tree only the M best candidates are kept and expanded through the next level in the tree. As a result, they can yield drastic reductions in complexity by proper choice of the M parameter, at a cost in bit-error-rate performance. These methods directly employ the "hard-output" M-algorithm, to generate hard-output estimates, and then employ the resulting M full-length candidates to obtain soft information. However, to generate soft information for any bit location, both values of the bit must be available in the pool of the remaining M candidates. As a result, when one of the bit-values is missing for a given bit location in the set M full-length candidates, these methods resort to heuristic (and inferior) softify-ing techniques to generate soft output for each bit. Also, these methods do not exploit iterative decoding.

MMSE-based inner decoders have much lower complexity but suffer in bit-error-rate performance, especially, at higher outer-code rates.

Systems employing a tree search based on conventional SOMA where reliability values are calculated recursively in the forward direction only will sometimes yield reliability values which are not calculated relative to the globally best sequence estimating the MAP or MLD output sequence; these typically also use a large number of early terminated paths to collect soft output at the intermediate levels in the tree.

Schemes involving forward-backward SOMA versions with tree reordering correspond to the best soft-output algorithms subject to the constraint that the survivor list at each stage consists of the paths with the best set of metrics. Some proposed algorithms do not necessarily include all the paths with the best metrics and can outperform the forward-backward SOMAs by providing bit log-likelihood ratios (bit-LLRs), i.e., soft-output information, based on longer sequences.

Note also that there exist many other inner decoder structures, including spherical decoders, soft-output Viterbi-algorithm (SOVA) based inner-decoders, etc.

SUMMARY OF THE INVENTION

A method and apparatus is disclosed herein for a soft output M-type algorithm. In one embodiment, the soft output M-type algorithm is employed by a receiver in a communication system to receive information-bearing signals transmitted from the transmitter, where the receiver comprises: an inner decoder structure having a multiple-in multiple-out (MIMO) joint demapper to perform joint inner demapping over each tone, the joint demapper being operable to apply a soft-output M-type algorithm to identify survivor candidates at each depth in a detection tree being searched for each tone, including surviving full-length candidates, based on at least one metric and at least one other criterion, where a number of best alternatives from every level of the tree are expanded along with one or more alternatives selected meeting the at least one other criterion and where soft-output related information is collected and stored for each bit, and an outer decoder operable with the inner decoder to perform iterative decoding.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flow diagram of one embodiment of a decoding process.

FIG. 13 shows two tables and a list of ordered paths.

FIG. 14 shows an alternative embodiment of the two tables and a list of ordered paths.

DETAILED DESCRIPTION OF THE PRESENT INVENTION

Figure 2:
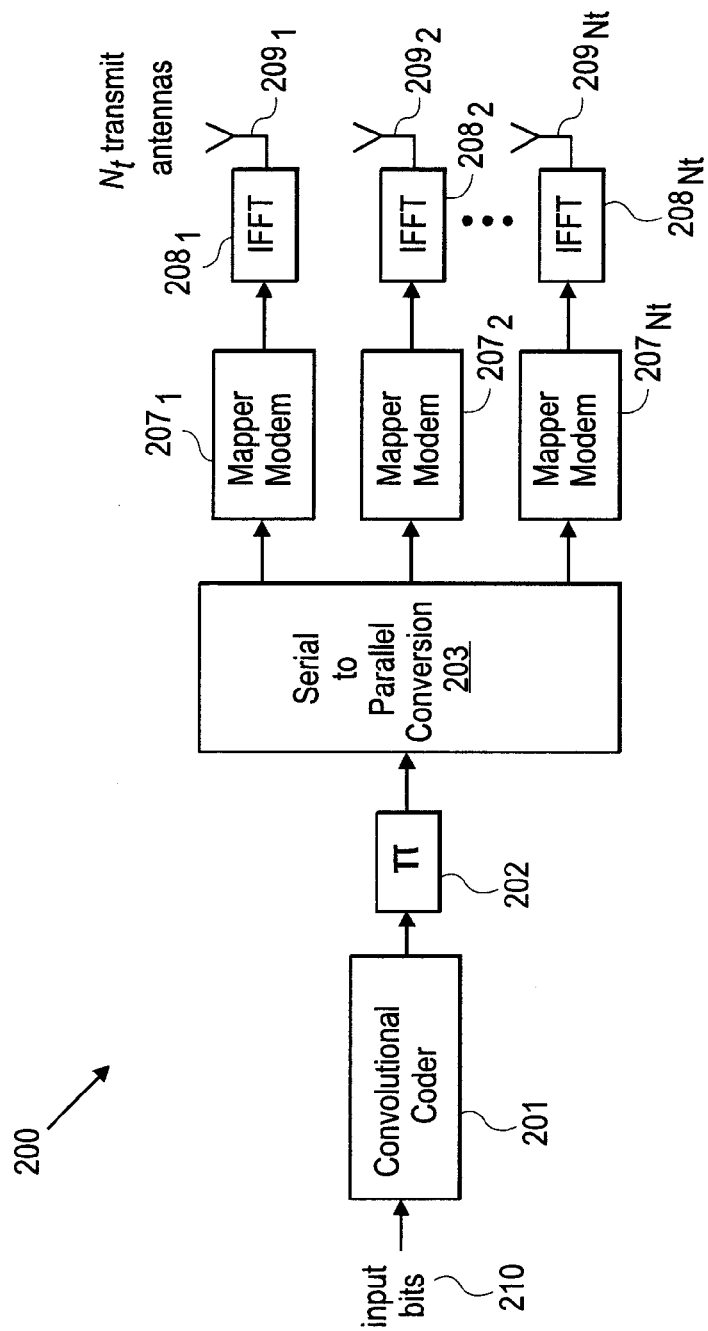
FIG. 2 is a block diagram of one embodiment of a transmitter for space-time coding with bit-interleaved coded modulation (BICM) and OFDM where it is assumed as an example that the outer binary code is a convolutional code.

Embodiments of the present invention deal primarily with the forward link, i.e., the base-to-mobile direction of transmission and more specifically reduced complexity receiver structures for these systems. Methods and apparatuses are disclosed for adaptive reduced complexity receiver structures. These receiver structures consist of inner/outer decoder modules that exchange information. The receiver structures can be single or multiple-iteration structures. In one embodiment, the inner/outer decoding structures exploit M-algorithm type searches. Specifically, in one embodiment, the inner/outer decoding structures use different criteria in selecting the survivor candidates at every stage in the M-type algorithm. This favorably improves the soft-output information provided by the inner decoder.

In one embodiment, the soft-output MIMO inner-decoder makes adaptive use of a new class of soft output M-algorithms, (SOMA). This soft-output MIMO detector is applied on every tone (or, sub-channel) in the OFDM system, as well as at every iteration in the decoding. The SOMA detector uses only a fraction of the total number of candidates in its MIMO detection process, thus a considerable complexity reduction. There is of course a tradeoff between the performance and the degree of complexity reduction. The number of candidates explored in the SOMA is controlled by the parameter M, the number of paths that are extended from each surviving node at every level in the detection tree. In the overall detection process, the number of inner/outer decoder iterations, I, also affects the total decoding complexity and the associated performance. Note that during any given iteration of the decoding operation, SOMA-based inner decoding is performed independently on each OFDM tone.

While a conventional SOMA conducts a reduced size tree search by keeping as its M survivors at each depth the best M candidates at that depth, other criteria can be employed in addition to the path quality metric to decide which paths are chosen as the survivor paths, so that the M survivor paths at any given stage may differ from the paths with the best-quality metrics. In one embodiment, the survivor list is augmented (some of the M best candidates in the survivor list are replaced) with paths that can improve the soft-output information provided on one or more bits.

In one embodiment, in the disclosed reduced-complexity algorithm, at each stage the list of paths, referred to as the "survivor list," is selected subject to a modified set of criteria. These criteria allow the selection of some survivor paths that may have lower-quality metrics than some of the paths that are not included in the survivor list. The new criteria allow these paths to be selected as survivors because, despite their lower-quality metric, they can improve the soft-output information that will be eventually produced by the algorithm. In particular, due the bit combinations these paths represent and their relationship to the bits-combinations of the rest of the surviving paths, their inclusion in the list allows soft-output information to be collected for some bit locations based on longer paths (with more reliable metrics) in the tree.

The techniques described herein can be utilized to improve "softified" M-algorithms, SOMA and forward-backward SOMA (FB-SOMA) algorithms and can also be used in conjunction with channel-adaptive methods that have been proposed as modifications to the basic SOMA algorithm for providing further complexity/performance benefits. In the FB-SOMA, some information is stored for soft-output calculations in the forward pass. Once the forward pass is complete and the best full-length path has been chosen, the algorithm also goes through a backward pass. During the backward pass, the reliability (soft-output) information on each of the bits is computed based on and the quality of the (available) best full-length path and the information stored at the various stages of the forward pass.

The new schemes described herein are referred to herein as SOMA with survivor selection (SuSe-SOMA) and FB-SOMA with survivor selection (SuSe-FB-SOMA).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

As set forth above, embodiments of the present invention perform an adaptive soft-output M-algorithm that uses modified criteria for selecting the survivors. Such criteria, for example, may be used for both SOMA, FB-SOMA, and softified SOMA. More specifically, the survivor-selection method in the M-algorithm has been modified to include soft-output information considerations. In particular, additional information is exploited, in addition to the metric for selecting the survivors at each depth in the tree, and as a result, the survivors are not necessarily the M best alternatives in terms of the metric of interest. That is, in order to obtain reliable soft information by the decoding soft-output algorithm, other modified selection criteria are employed to choose the survivor set that limits the search on the tree.

FIG. 1 is a flow diagram of one embodiment of a decoding process for producing a first set of output data representing most likely transmitted bit estimation values and information about the reliability of each of these estimates. The process may be performed by processing logic that may comprise hardware (e.g., dedicated logic, circuitry, etc.), software (such as is run on a general purpose computer system or a dedicated machine), or a combination of both. In one embodiment, the decoding process is performed by a receiver in the wireless communication system.

Referring to FIG. 1, the process begins by performing a first decoding operation to produce a first set of output data representing most likely transmitted bit estimation values and information about the reliability of each of these estimates, including performing a detection process over each tone for joint inner demapping, by applying a modified soft-output M algorithm to identify survivor candidates at each depth in a detection tree being searched for each tone, including surviving full-length candidates, based on at least one metric and at least one other criterion, where the best from every level of the tree are expanded along with one or more alternatives selected meeting the at least one other criterion and where soft-output related information is collected and stored for each bit (processing block 102).

In one embodiment, at any given tree depth in the M-algorithm, the demapper orders all paths according to their metric, and uses the additional criteria, besides the metric order, to select the survivor paths. The demapper takes into account the bit locations for which all paths in the survivor list agree in value to select the survivor paths. In one embodiment, the demapper constructs the survivor list by first adding the candidate with the best metric to the list (or more generally, by adding the M candidates with the best metrics to the list), and then iteratively adding members in the list based on their relative metrics, as well as the effect their addition to the survivor list would have on the number of bit locations for which all paths in the survivor list agree in value.

The process also includes calculating a soft output value for each bit by comparing a metric of partial path from an estimated best path with the metric of the longest and best visited path with an opposite decision on that bit (processing block 103).

In one embodiment, a selection process is used for a modified version of a forward-backward SOMA algorithm, whereby the survivor list at each depth consists of the union of the M' paths with the best metrics and another set of $M_e$ candidates that are selected based on their metrics as well bit-LLR considerations. This will be described in greater detail below.

Figure 10:
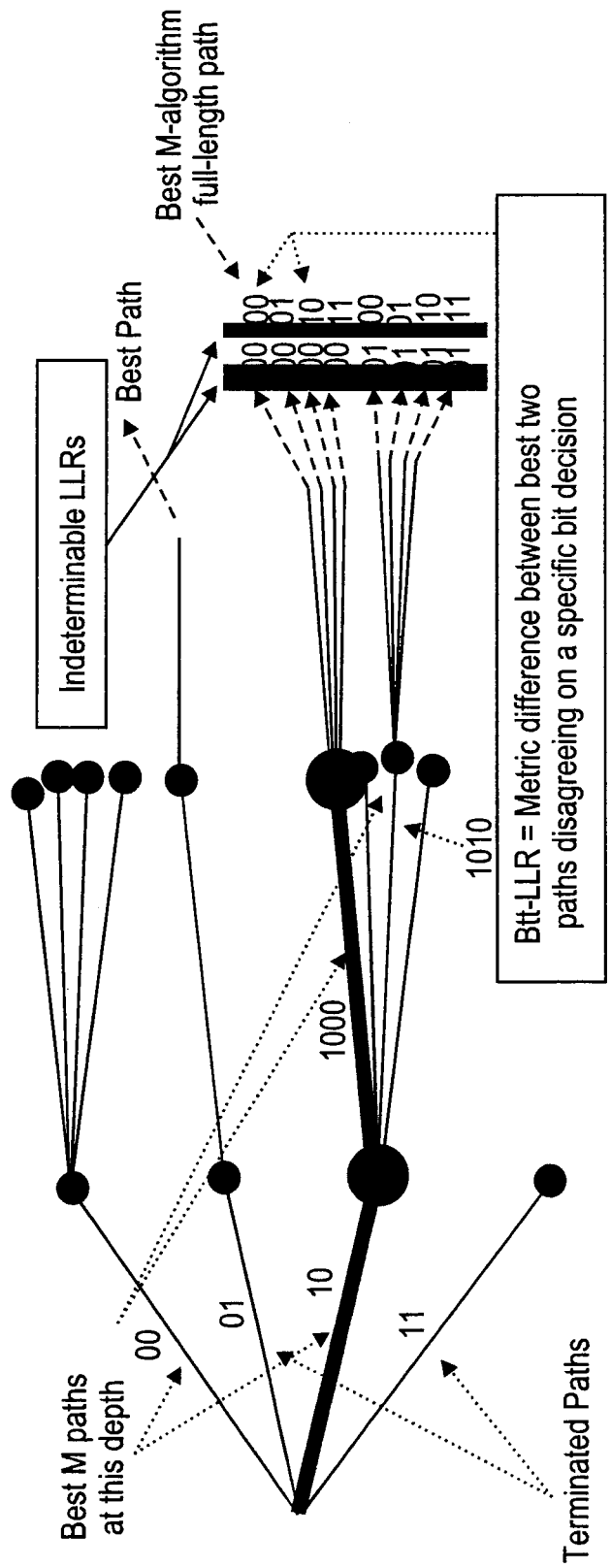
FIG. 10 illustrates the indeterminable LLR problem that arises in generating soft output for all bit locations based on full length candidates, where all full-length candidates in this example agree in their decisions for bit locations 1, 2, and 4.

FIG. 10 provides an illustration of an indeterminable LLR problem. This is an important problem that arises in many soft-output algorithms relying on a reduced tree-search based on an M-algorithm. In particular, the problem arises in the process of generating soft output for all bit locations based on full-length candidates. All full-length candidates in the example agree in their decisions for bit locations 1, 2, and 4. As a result, there are no full-length candidates available with alternative decisions for bits 1, 2, and 4 (i.e., candidates with decisions 0, 1, and 1, respectively, on those bits).

The SOMA and FB-SOMA deal with this problem by computing bit-LLRs (soft output information) for those bit locations based on metric comparisons of shorter-length paths. In particular, as explained above, each bit-LLR is computed as a difference between the metrics of two paths. One of the paths is an early-terminated path at some depth "n" in the tree, while the other corresponds to a survivor path at the same depth. Both the SOMA and the FB-SOMA have some very attractive features in the way they obtain reliable soft output information based on full-length and early-terminated paths. However, they are limited in that they rely on an M-algorithm to generate the paths for which metrics will be computed throughout the tree. Although such an M-algorithm keeps as survivors at each depth the set of paths with the best metrics, and it can in principle be tuned to find the best full-length path with high probability, unfortunately, it makes no provisions to have long paths with alternative bit decisions (other than indirectly through increasing the number of survivors at each depth). As a result, it is likely that for a subset of the bit locations, reliability is computed at small depths (based on short paths). This implies that only a subset of the measurements is used for computing reliability for these bits. The problem is somewhat alleviated if a tree-preordering step is applied as described in U.S. Ser. No. 12/335,389, entitled "Tree Position Adaptive Soft Output M-Algorithm Receiver Structures", filed Dec. 15, 2008, which is incorporated by reference. Specifically, the quality of the information provided by the processed measurements employed at different tree depths, degrades with tree depth. As a result, although the SOMA and FB-SOMA have to rely on partial paths for some bit-LLR calculations, tree preordering alleviates the effect of the metric approximation based on partial (as opposed to full-length) paths. On the other hand, making provisions to include members in the survivor list not just based on metric quality but by also trying to increase the length of paths used to compute bit-LLRs will in general boost the quality of the soft output information provided by the inner decoder.

One embodiment for the reduced complexity receiver is a modified version of a soft output M-algorithm (SOMA), which is used adaptively with a forward-backward tree search, and whereby the survivor-selection method in the M-algorithm has been modified to include soft-output information considerations. In particular, additional information is exploited, besides the metric for selecting the survivors at each depth in the tree, and as a result, the survivors are not necessarily the M best alternatives in terms of the metric of interest. Specifically, keeping in mind that it is of interest to obtain reliable soft information by the decoding soft-output algorithm, other modified selection criteria are employed to choose the survivor set that limits the search on the tree.

Figure 11:
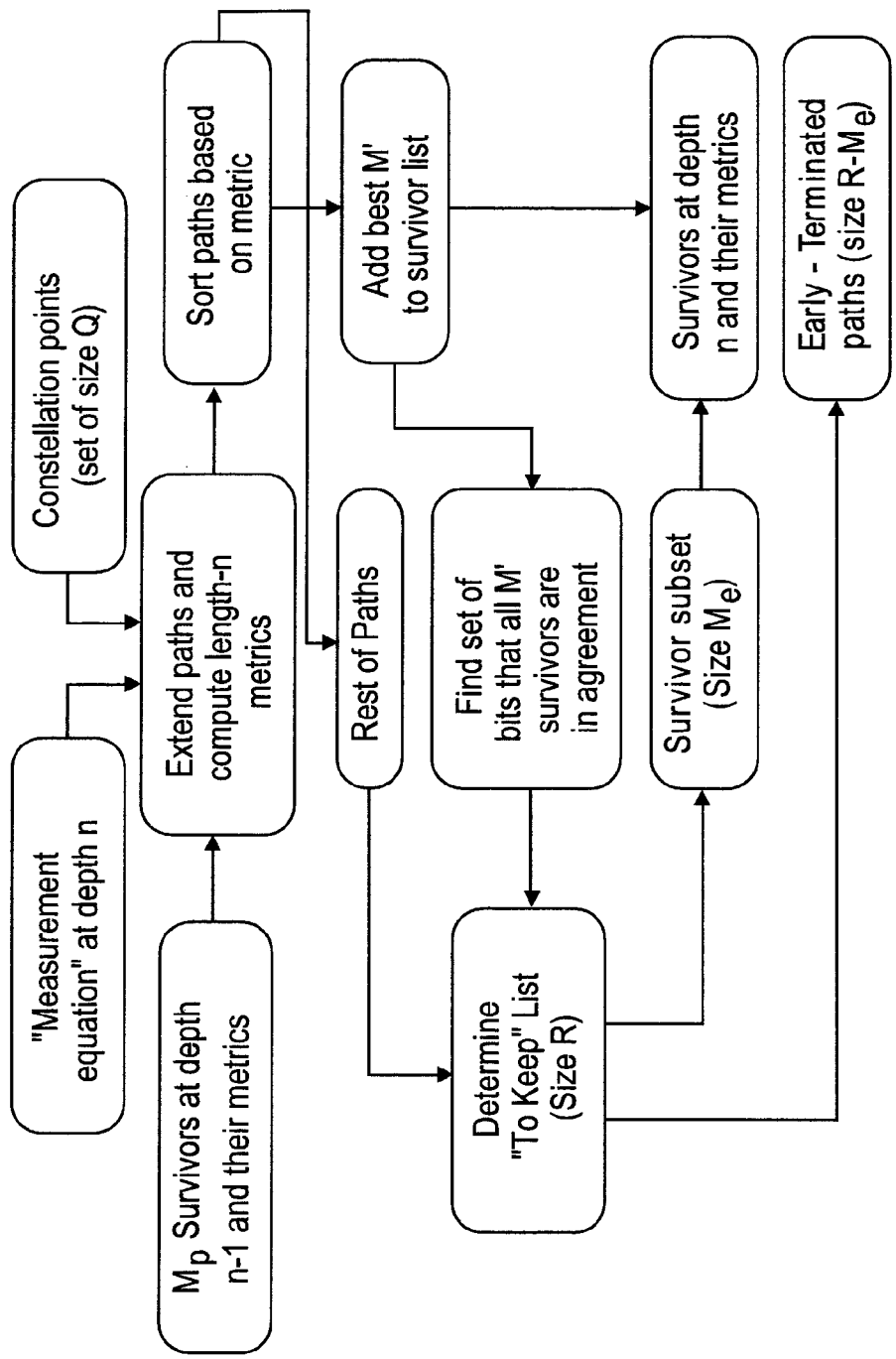
FIG. 11 illustrates a flow diagram describing the selection of survivors and terminated paths at tree depth n.

FIG. 11 depicts a flow diagram of one embodiment of a selection process for a modified version of a forward-backward SOMA algorithm, whereby the survivor list at each depth consists of the union of the M' paths with the best metrics and another set of $M_e$ candidates that are selected based on their metrics as well bit-LLR considerations. The process is performed by processing logic that may comprise hardware (circuitry, dedicated logic, etc.), software (such as is run on a general purpose computer system or a dedicated machine), or a combination of both. The results of the process are the survivor list and the early-terminated list at a fixed but arbitrary depth "n".

Figure 9:
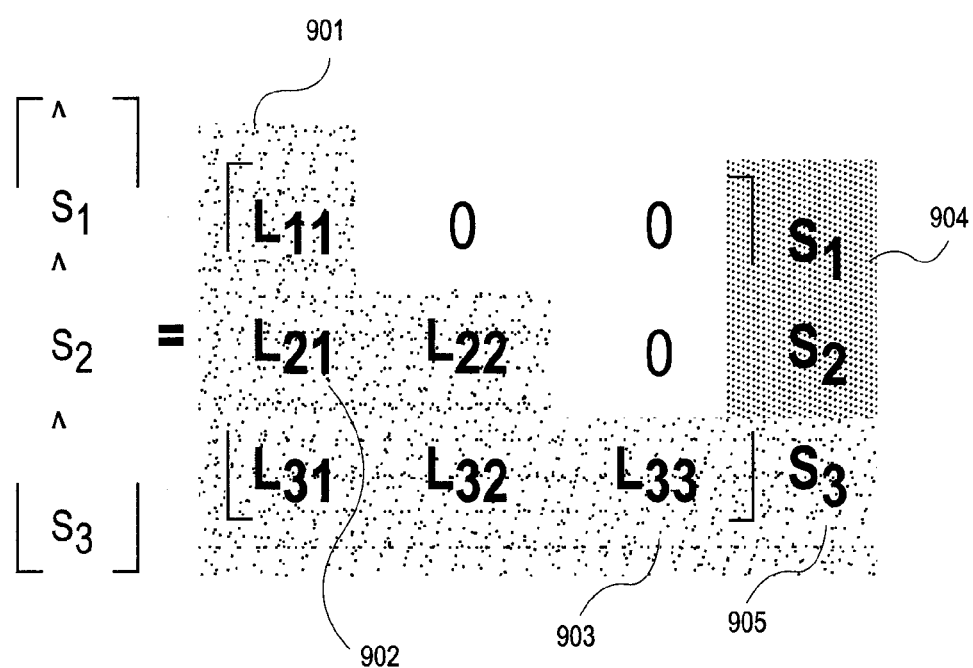
FIG. 9 illustrates the result of a QR decomposition.

Referring to FIG. 11, the inputs to the process are the following: (i) the list of survivors at depth "n−1" and their metrics; (ii) the "effective" observation/measurement at depth "n" (i.e., the nth output sample from the QR decomposition; see FIG. 9); (iii) the set of Q QAM constellation symbols. First, for each survivor at depth "n−1", processing logic uses these inputs to compute metrics for all Q paths emanating as length-1 extensions of the given survivor (one path per constellation symbol). Given there are $M_p$ survivors at depth "n−1", path metrics are thus computed for a total of $QM_p$ paths. That is, the paths of the $M_p$ survivors at depth n−1 are extended and their lengthen metrics are computed. This is performed in a manner well known in the art. Each length-n metric is computed as the sum of length-"n−1" metric of the parent node (survivor node at previous depth) and the "branch" metric of the associated length-1 extension.

Next, processing logic orders (sorts) these paths based on their metric with the first element in the list corresponding to the path with the best metric and the last one corresponding to the path with the worst path metric. After ordering the paths, processing logic splits this sorted list into two sets. The top M' elements (where M'≥1 may be a preselected or adaptively chosen parameter, similarly to the M parameter in the conventional M-algorithm) are added to the survivor list, while the rest of paths are kept in a "Rest of Paths" list.

After splitting the sorted list, the binary representations of the M' lengthen survivor paths are examined (they are all nB-bits long). Processing logic compares these binary codewords in order to determine the set of bit locations where all M' paths agree in value. The resulting list of bit locations where all paths agree is referred to herein as the "Common-Bits" list. If this list is empty, the survivor-selection process terminates at depth "n". In the case that this list is not empty, for each bit location in this list, processing logic also examines the bit values of each of the paths in the "Rest of the Paths" list, one at a time, starting from the top (best) of the "Rest of the Paths" list. In one embodiment, this is accomplished by the following. First the "Common-Bits" list is copied onto a new list, referred to herein as the "Common-Bits-Temp" list. Starting from the first path in the "Rest of the Paths" list, processing logic compares its bit-values in the bit locations listed in the "Common-Bits-Temp" list against the (common) values of the survivor list. If there is agreement in value in all these bit locations between this path and the survivor list, then processing logic dismisses the path. If, however, there are one or more bit-locations of disagreement, then processing logic copies the path (from the "Rest of the Paths" list) to the "To Keep" list. In that case, the bit locations of disagreement are also removed from the "Common-Bits-Temp" list. The process continues with the next path in the "Rest of Paths" list. The process terminates if there are no more candidates in the "Rest of Paths" list, or the "Common-Bits-Temp" list is empty.

Then, letting "R" denote the number of elements in the "To Keep" list, processing logic appends a subset of $M_e$ elements from the "To Keep" list to the survivor list, and the rest ($R-M_e$) of the elements in the "To Keep" list are kept as the early terminated paths. Note that the original SOMA (and the original FB-SOMA depending on how soft-output information is computed) employ $M_e=0$. In one embodiment, the set M' is predetermined and $M_e=R$. In another embodiment, the set M' is predetermined and $M_e$ includes no more than K elements for some preset value K. In these two embodiments, the value of survivors M is variable, as it depends on R, the number of elements in the "To Keep" list.

There are also many other embodiments that employ iterative versions of the above process in which the list of M' "Survivors" and the R paths in the "To Keep" list are updated in an iterative fashion. For illustration, a couple of representative example processes are provided. In these examples, the number of survivors that will be kept in the end at depth n is a fixed, but arbitrary value, of M where M≥1 (the value M can vary from depth to depth). In one example process, some value for M' is set, e.g., M'=1. In this case, the example process selects as the only survivor in the list the best candidate (in terms of its length-n metric). Then the "To Keep" list is generated. If the size, R, of the "To Keep" list is such that R+1≥M, then the top $M_e$=M−1 members from the "To Keep" list are used to append the survivor list (total of M members) and the rest (R−$M_e$) paths from the "To Keep" list comprise the list of early terminated paths. If M>R+1, however, then appending all R paths in the "To Keep" list yields a list of survivors of size R+1<M, so there is space for another M−(R+1) candidates to be added to the survivor lists. These survivors are added from the original sorted path lists as follows: (i) the survivor set is deleted from the sorted list; (ii) the first M−(R+1) paths in the resulting list are added to the survivor list. The process naturally, generalizes to the case that M'>1. In that case, if the size of the "To Keep" list is such that R+M'≥M, then $M_e$=M−M' members from the "To Keep" list are used to append the survivor list (total of M members) and the rest R−$M_e$ are used to update the list of early terminated paths. Similarly, if M>R+M', appending all R paths in the "To Keep" list yields a list of survivors of size R+M'<M, so there is space for another M−(R+M') candidates to be added to the survivor lists. These survivors are added from the original sorted path lists as follows: (i) the survivor set is deleted from the sorted list; and (ii) the first M−(R+M') paths in the resulting list are added to the survivor list.

In another embodiment, survivors are added to the list iteratively, one by one. At first the two candidates with the best two metrics are selected and put in the survivor list (assuming total number of survivors allowed, M, is at least as large as 2). In preparation for adding the next survivor to the list, first the "Rest of Paths" and "To Keep" lists are generated. Two candidates are considered for inclusion in the survivor list: (i) the best candidate in the set of "Rest of Paths" list; and (ii) the best candidate in the "To Keep" list (this candidate is also a member of the "Rest of Paths" list, although not necessarily its best candidate). If (i) and (ii) correspond to the same candidate, then that candidate is added to the survivor list and the process of adding the next survivor is repeated. If candidates (i) and (ii) differ, a criterion is employed for selecting the next candidate. One example involves the case where the criterion is to always select candidate (i), in which case, the method reduces to the traditional M algorithm, which selects as survivors, the M paths with the best metrics. When the criterion is to always choose candidate (ii) we obtain the embodiment of the previous paragraph. In general the (i) vs. (ii) selection criterion can take into account multiple criteria such as the relative metric differences between candidate (i) and candidate (ii); the depth of the tree; the size of the resulting "Common-Bits" list (one based on the survivor list and candidate (i), and another based on the survivor list and candidate (ii)), as well as other parameters. A generalized version of this embodiment includes joint comparison/selection of one or more candidates in an iterative fashion based on comparisons of multiple elements from the "Rest of Paths" and "To Keep" lists.

Figure 12:
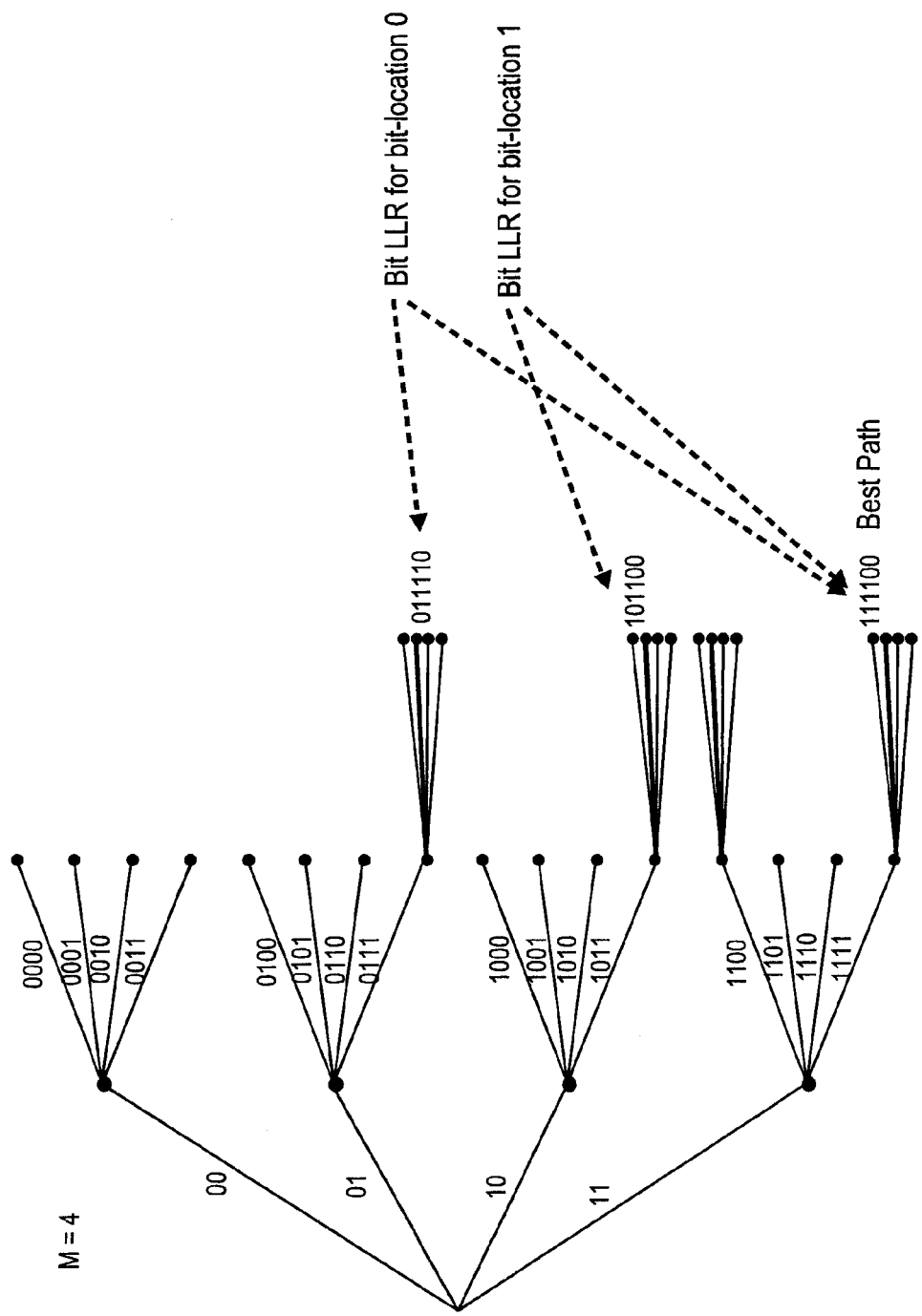
FIG. 12 illustrates a process with an example involving a tree in which the best path is shown.

In one embodiment, the set of survivors selected at depth n include the smallest set of n-length paths visited with the following properties: (i) the best M' candidates are included as survivors; (ii) for each bit-value and each of the nB bit locations (in each visited length-n path), the best M" visited n-length candidates are also included. In one embodiment, to implement the case M'=1 and M"=1, two tables are used to determine which survivors other than the best path to keep in the survivor list, as each path is processed in an ordered fashion from the best path to the worst path. FIG. 12 illustrates the process with an example involving a tree in which the best path is shown as 111100. Two other paths are identified that are not in the list of top paths. There are paths 101100 and 011110. FIG. 13 shows two tables and a list of ordered paths. The tables are stored in a memory in the receiver and are used to make sure all the bit locations of the codewords are included and ensure that paths are selected where bit locations differ for each bit location. Note that the tables are only shown with four locations. In general the number of columns in each table is equal to the number of bits in the codewords at the given tree depth. The ordered paths are ordered in terms of their path metrics from best path at the top of the list to worse paths as one goes down the list. The process begins by traversing the list and checking paths one at a time to decide whether or not to append the path to the survivor list. In particular, a path is appended to the survivor list if the path "contributes" a bit-value b (with b=0,1) at some bit-location c (c is a number from the list {1, 2, . . . , nB}) which is not in the survivor list (i.e., no other path in the survivor list has bit-value b at bit location c). For example, in the table of FIG. 13, the best path, 1111, contributes all of its bits, which happen to all be 1's and completely fills the 1's table. Therefore, it is kept as a path and all the 1-value table entries are marked with an "x" (or equivalently, if they were initialized with a "0" value, they are incremented to "1" denoting that collectively in the current list of survivor paths, there is a single 1-value at each bit-location). The next path is processed and it has one bit, the fourth position being a 0, that is not present in the table. Therefore, this path is kept, and the fourth entry of the 0-value table is marked with an "x" (or, equivalently, it is incremented to "1" if it was initialized with a 0 value). The same occurs for the next path which has a 0 bit in its third position and no such bit exist yet in the 0's table. However, the next path, 1100, contains bits that are all duplicative of bits that have been in the previously processed paths; therefore, it is not kept. This process continues through the list until all the memory locations in both the 1's and the 0's tables are covered, and the remaining paths are discarded.

In one embodiment implementing a generalization of this case involving M'≥1 and M"≥1 (the M" best candidates are kept for each bit location and bit value), two tables are also used to determine which survivors other than the best path to keep in the survivor list, as each path is processed in an ordered fashion from the best path to the worst path. In that case, all entries of the 1-value and 0-value tables are initialized with a "0" value. All the paths are considered again in progression, from best to worst as candidates for the survivor list. Let $b_k$ denote the value of the kth bit of the path being considered for addition in the survivor list. At any given time in the algorithm the kth entry in the 0-value (1-value) table shows how many candidates in the survivor list have 0 (1) in their kth location. When a given candidate path is added in the list, for each bit location k from 1 to nB, if the path has a zero in location k, the kth entry of the 0-value table is incremented by 1, else the kth entry of the 1-value table is incremented by 1. One algorithm that accomplishes generating the desired list works as follows: first each of the first M' candidates is added in the survivor list, one at a time, and each time a candidate is added to the survivor list the associated entries of the 0-value 1-value tables are incremented by 1. Once the first M' candidates haven been all added to the survivor list, the algorithm calculates the minimum value among all entries of the 0-value and the 1-value tables. If that value equals or exceeds M'' the algorithm terminates (and the survivor list corresponds to the best M' paths). If not, the algorithm proceeds through the remaining visited paths from best to worst. When a candidate path is considered, its value at each bit location (from location 1 to location nB) is checked against the tables. Let $b_k$ denote the value of the kth bit of the path being considered for addition in the survivor list. If there exists a bit location k, such that $b_k=0$ ($b_k=1$), i.e., the candidate has a 0 (1) value at location k, and the kth 0-value (1-value) entry is less than M'', then the candidate is added to the survivor set (and all the corresponding entries of the 0-value and 1-value tables are incremented by 1). Else, if for every bit location k, the value of the $b_k$-table is M'' or larger, then the path is discarded. The process is repeated until all entries of the 0-value and the 1-value tables are at least as large as M''. Note that this case allows for the use of improved MaxLogMap metrics in the soft-output computations when M''≥2. FIG. 14 shows such an embodiment that uses two tables and a list of ordered paths for M''=2. Referring to FIG. 14, as with the tables in FIG. 13, each of the order paths is examined and the table is marked until all positions in the tables have been marked at least two times.

In one embodiment, a MaxLogMAP approximation is used to compute bit-LLR values for each bit location. In one embodiment, bit-LLRs are computed using the MaxLogMAP approximation based on candidates selected via an M-algoritim tree search, whereby the survivor selection criterion at each depth in the tree is such that at least one candidate is kept for each possible bit-value and bit-location. In this case the bit-LLR values are computed based on full-length sequences. In another embodiment, bit-LLRs are computed using an improved MaxLogMAP approximation that is also based on candidates selected via an M-algorithm search, whereby the survivor selection criterion at each depth in the tree is such that at least one candidate is kept for each possible bit-value and bit-location. In this case the bit-LLR values are computed based on an improved MaxLogMAP approximation using full-length sequences. In this case, the well-known improved MaxLogMAP approximation, using J surviving candidates per bit-value and bit locations, is as follows; for a given bit location, let $\alpha_1, \alpha_2, \ldots, \alpha_J$ denote the (log-posterior) path metrics of the best full-length surviving paths that have bit-value 1 at the given bit location; also let $\beta_1, \beta_2, \ldots, \beta_J$ denote the (log-posterior) path metrics of the best full-length surviving paths that have bit-value 0 at the given bit location; the bit-LLR for the given bit is then computed as follows:

$$\log\left[\frac{\sum_{j=1}^{J} e^{\alpha_j}}{\sum_{j=1}^{J} e^{\beta_j}}\right]$$

One way of computing the above bit-LLR estimates exploits the max* term relationship of the following equation:

$$\max{}^*(x,y)=\max(x,y)+\log(1+e^{-|x-y|})$$

Example Embodiments of Wireless Communication Systems

A wireless communication system comprising a first device (e.g., a base station) having a transmitter and a second device having a receiver (e.g., a mobile terminal) to receive information-bearing signals from the transmitter wirelessly transmitted using OFDM and bit interleaved coded modulation is described. In one embodiment, the communication system described herein is a coded modulation system that includes transmitters that apply space-time coding with bit-interleaved coded modulation that is combined with a multi-carrier OFDM modulation and receivers that apply OFDM demodulation with iterative demapping and decoding. The systems described herein have $N_t$ transmit antennas and $N_r$ receive antennas. Each of the $N_r$ receive antennas receives signals that are the sum of channel-distorted versions of the signals transmitted from the $N_t$ transmit antennas. Such coded modulation systems in accordance with the present invention may be advantageously employed in wireless local/wide area network (LAN/WAN) applications.

In one embodiment, the space-time coding system described herein comprises OFDM for wideband transmission, MIMO and large QAM constellations for high spectral efficiency, a bit interleaver for the bit-interleaved coded modulation scheme (BICM) and an outer binary code. The overall detection is typically performed iteratively. This requires that both the inner MIMO demapper and the outer decoder perform soft in soft out (SISO) detection/decoding. One system component contributing to the complexity is typically the joint demapper as explained above. The outer decoder is less critical in terms of complexity. In one embodiment, the MIMO detector in principle works with any binary outer code. This code could be a turbo code, an LDPC code, a regular convolutional code or an RCPC code. The decoder for the outer code is preferably a soft in soft out (SISO) type decoder, for example a MAP decoder. The outer decoder supplies soft information to the inner MIMO detector for iterative decoding.

While the exemplary embodiment is described for space-time coding with bit-interleaved coded modulation, other types of coded modulation for space-time coding may be used. In addition, the exemplary embodiments are described for a mapping of the bit-interleaved coded data into symbols using QAM; however, other modulation schemes may be used, such as, for example, but not limited to phase-shift keying (PSK).

Generally, the receiver includes circuitry that estimates the values for the elements in channel response matrix H[f], and such estimates may be generated using periodic test (pilot) signals transmitted by the transmitter to the receiver. Such a priori information of the channel impulse response may also be generated via simulations. The matrix H[f] denotes the channel response over the fth OFDM tone and is a matrix of dimensions $N_r$ by $N_t$.

When combined with signal processing, multiple transmit and receive antennas can yield communication links with increased bandwidth efficiency (data rate), extended power efficiency (range), or both. Embodiments of the invention deal primarily with the forward link, i.e., the base-to-mobile transmission direction of transmission. Methods and apparatuses are disclosed for adaptive soft output M-algorithm based receiver structures.

In one embodiment, a reduced complexity soft output MIMO detector in the receiver makes use of a soft output M-algorithm (SOMA) with modified survivor selection criteria, which is described in greater detail below. In one embodiment, the soft output MIMO demapper is applied for every tone or subchannel in the OFDM system, as well as at every iteration in the decoding process. To illustrate the advantages of the SOMA demapper, consider for illustration the optimum MIMO detector, referred to as a maximum a posteriori probability (MAP) detector. The MAP performs a joint demapping function over all the transmit antennas and over all the involved QAM constellation symbols and bits. Consider also for illustration the asymptotically optimum but simpler (with respect to the MAP) exhaustive MaxLogMAP detection algorithm. Even in the simpler MaxLogMAP detector an exhaustive demapping operation is required and it involves a search space that is growing exponentially with the product of the number of transmit antennas ($N_t$) and the number of bits per QAM constellation point (B). For example, with a 6 by 6 MIMO system (6 transmit antennas and 6 receive antennas) using 64 QAM modulation (6 bits per constellation point) this product is 36. In such a case, the decoding complexity is of the order of $2^{36}$, and the MaxLog-MAP cannot be implemented with the technology of today. In contrast, in one embodiment, the SOMA detector only uses a small fraction of the total number of candidates in its MIMO detection process, thus the considerable complexity reduction. There is of course a tradeoff between the performance and the degree of complexity reduction.

In one embodiment, as described in further detail below, the SOMA is used adaptively, in that the tree-search symbol order when performing a detection search is adapted by each SOMA module (one per OFDM tone) according to the channel conditions (on the given OFDM tone) in order to optimize the overall complexity-performance trade-offs of the receiver. More specifically, during every inner/outer decoder iteration, a SOMA detector performs a SOMA detection process on each OFDM tone. In one embodiment, the number of candidates explored in the SOMA detection process is controlled by the parameter (M) that indicates the number of paths that are extended from each node or level in the detection tree. In particular, at any given level in the detection tree, only a subset M of the visited candidates are kept as survivors and are going to be extended at the next level. The rest of the candidates tested at this level are referred to as early-terminated paths. The early terminated paths are used by the SOMA for performing soft-output calculations. In one embodiment, the number of early terminated paths that are explored in the SOMA detection process is also an adaptation parameter as these paths also play a role in the soft output calculations. For purposes herein, this value is denoted T and is used in the soft output value calculation by the algorithm. In the overall detection process the number of inner/outer decoder iterations, I, also affects the total decoding complexity and the associated performance.

In one embodiment, the SOMA process performed by the receiver is referred to herein as a forward-backward SOMA (FB-SOMA), and is based on a forward pass and a backward pass through a detection tree. The FB-SOMA process performs a search through the detection tree via a modified M-algorithm, while recursively collecting soft-output information. The FB-SOMA process also uses the value that the best visited full-length codeword takes on any given bit location as its hard-estimate for that bit. Furthermore, the soft information on this bit is computed as the difference between two, same-length path metrics, that differ in their value on the given bit location. Unlike the SOMA, however, in the FB-SOMA the soft information on this bit is computed as the difference between a metric of the best visited full-length codeword and the metric of the longest alternative-decision path visited, i.e., the best visited path with a different decision on the given bit from that of the best visited full-length path. Thus, the FB-SOMA soft-output on any bit is the metric difference between the best and longest paths visited with decisions 1 and 0 on that bit location.

More specifically, in the forward pass, the FB-SOMA process collects the best and longest path metrics associated with all the alternative bit decisions. In particular, assume that at depth i−1, there are survivor paths for each bit value at a given bit location. If the depth-i survivor paths all agree in value at that bit location, then the best early terminated path with an alternative decision at depth i is used as the metric for the alternative decision path in the bit soft-output calculation. The other path used in this soft-output calculation is the length-i partial-metric of the best full-length path. To ensure that this partial metric is available at the end of the forward search, at depth i (for each i) all partial paths (lengths 1 to i) of all survivors at length i are stored and propagated through the tree. Then, in the backward pass, the nodes in the best full-length path are traced backwards and all the soft-output computations are computed against its partial metrics and the associated alternative-decision metrics.

In one embodiment, involving an OFDM based system with one MIMO detector for each tone, the complexity reduction in the SOMA based detector is implemented adaptively for each tone by use of symbol reordering followed by a SOMA-based decoder. In one embodiment, the reordering process is a relatively simple procedure based on CSI that is collected at the receiver (regardless of whether or not tree reordering is performed). The SOMA decoder employed over each tone can be fixed (using fixed M, I, T parameters) or it can be channel adaptive. The M value used in the SOMA tree may be fixed or it may vary over the decoding tree. In such a system, a MaxLogMAP metric can be employed.

In one embodiment, the parameters M and T and/or I are selected adaptively for the best overall performance for a given total complexity level, with the quantity that guides the adaptivity being the quality of the different OFDM tones. For example, a high signal level or alternatively a large signal to noise ratio (SNR) for a certain tone means a good quality level for that tone. In such a case, the SOMA detection process performs decoding with a lower value of M, a lower value of T and potentially a lower value of I. On the other hand, for a tone of poor quality, i.e. a tone with low signal level or low SNR, the SOMA detection process performs decoding with higher values of M, T and I for the best use of the overall complexity. The adaptivity can also be extended over time, i.e. over successive OFDM symbols.

Transmitter and Receiver Embodiments

Figure 3:
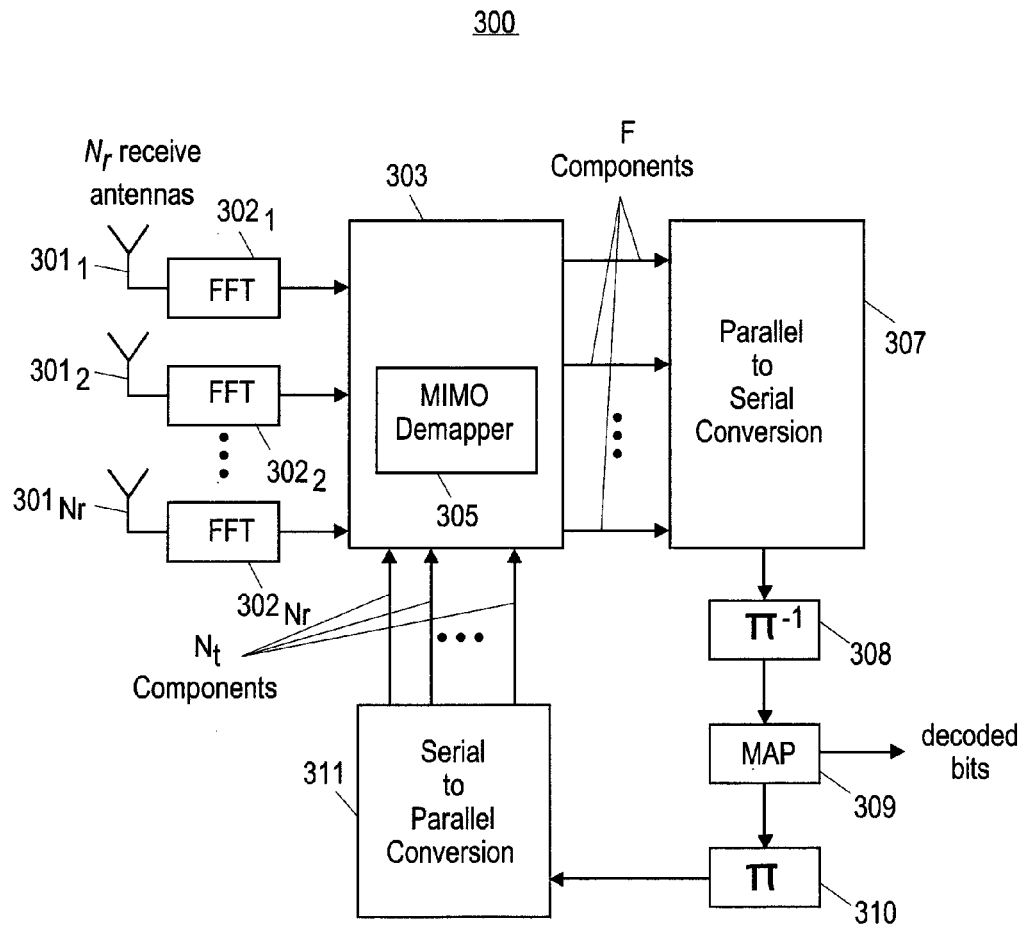
FIG. 3 is a block diagram of one embodiment of a receiver having an iterative decoder for the coded OFDM system shown in FIG. 2.

FIGS. 2 and 3 show the transmitter and receiver block diagrams for a MIMO/OFDM system with BICM and ID. More specifically, FIG. 2 is a block diagram of one embodiment of a transmitter for space-time coding with bit-interleaved coded modulation (BICM) with OFDM modulation for wideband frequency selective channels. Referring to FIG. 2, transmitter 200 comprises (as an example) convolutional encoder 201, bit interleaver 202, serial-to-parallel converter 203, mapper modems $207_1$-$207_{Nt}$, inverse fast Fourier transform (IFFT) modules $208_1$-$208_{Nt}$, and transmit antennas $209_1$-$209_{Nt}$. Note that IFFT modules $208_1$-$208_{Nt}$ also include circular-prefix operations, which are performed in a manner that is well known in the art. Also the resulting sequences generated by the IFFT/circular prefix modules are converted into electrical continuous-time signals via pulse-amplitude modulation in a manner that is well known in the art.

To perform BICM encoding to the data, convolutional coder 201 applies a binary convolutional code to the input bits (input data) 210. Bit interleaver 202 then interleaves the encoded bits from convolutional coder 201 to generate bit-interleaved encoded bits. This bit interleaving de-correlates the fading channel, maximizes diversity, removes correlation in the sequence of convolutionally encoded bits from convolutional coder 201, and conditions the data for increased performance of iterative decoding. Convolutional coder 201 and bit interleaver 202 may typically operate on distinct blocks of input data, such as data packets.

After performing bit interleaving, bit-mapping and modulation and OFDM are applied to the bit-interleaved encoded bits. Serial-to-parallel converter 203 receives the serial bit-interleaved encoded bit stream from bit interleaver 202. Note that serial-to-parallel converter 203 may include a framing module (not shown) to insert framing information into the bit stream, which allows a receiver to synchronize its decoding on distinct blocks of information. Serial-to-parallel converter 203 generates a word of length $N_t$ long, with each element of the word provided to a corresponding one of mapper modems $207_1$-$207_{Nt}$. Elements of the word may be single bit values, or may be B bit values where B is the number of bits represented by each modem constellation symbol.

Each of mapper modems $207_1$-$207_{Nt}$ converts B bits to corresponding symbols (of the Q-ary symbol space, with $Q=2^B$). The output of each modem mapper 207 is a complex-valued symbol (or equivalently two real-valued samples, representing the real and imaginary parts of the complex-valued symbol). Each of IFFT modules $208_1$-$208_{Nt}$ collects up to F symbols, and then applies the IFFT operation of length F to the block of F symbols. F is an integer whose value can typically range from 64 to 4096, or larger and depends on the available transmission bandwidth, the carrier frequency, and the amount of Doppler shifts that need to be accommodated by the system. Thus, each of IFFT modules $208_1$-$208_{Nt}$ generates F parallel subchannels that may be transmitted over the corresponding antenna among $209_1$-$209_{Nt}$. Each subchannel is a modulated subcarrier that is transmitted over the channel.

Figures 4, 5A:
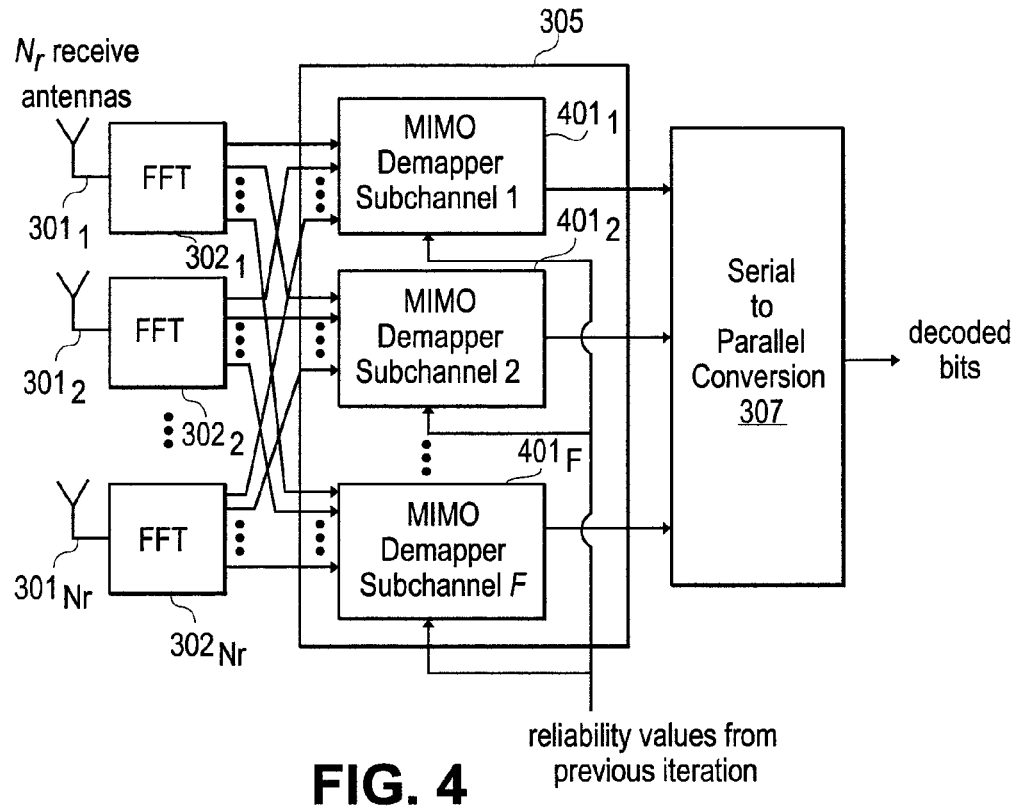
FIG. 4 is a block diagram of one embodiment of the MIMO demapper having MIMO joint demapper units with distinct demappers for the different OFDM tones for the MIMO/OFDM system with BICM/ID.
FIG. 5A illustrates a set partition type mapper for 16 QAM.
Figure 5B:
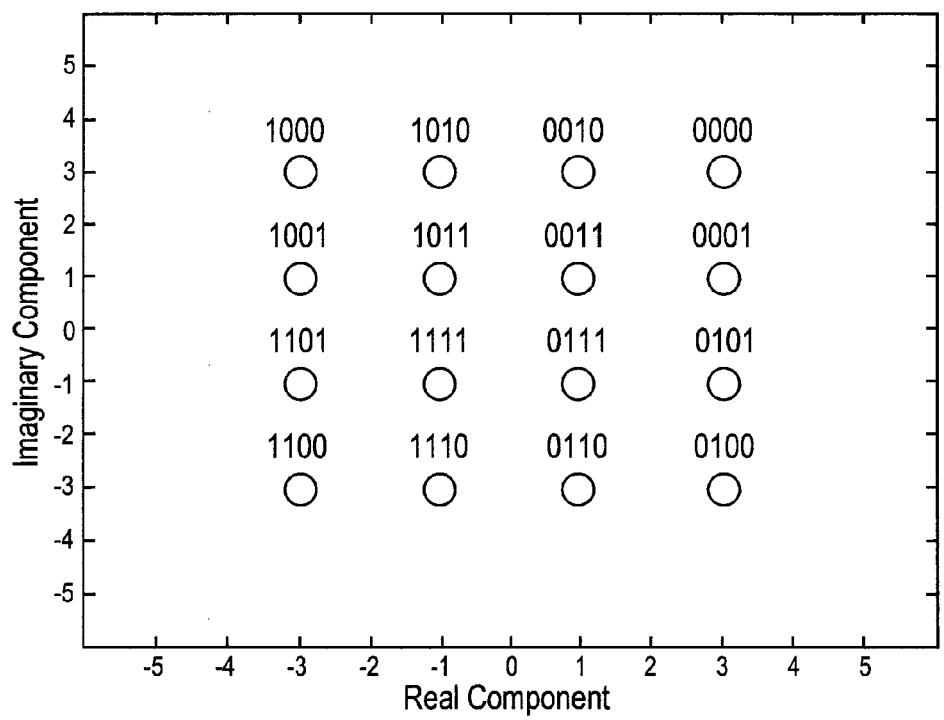
FIG. 5B illustrates a Gray mapper for 16 QAM.

In embodiment, the transmitter and receivers have an equal number of transmit and receive antennas, i.e., $N_t=N_r=N$. The binary information-bearing signal, hereby denoted as $u_k$, is encoded first at the transmitter by an outer binary code using convolutional coder 201, generating a coded sequence $c_k$. This sequence is interleaved by a bit interleaver 202. Then, each of mapper modems $207_1$-$207_{Nt}$ maps groups of B interleaved bits at a time into $2^B$-QAM symbols. The resulting QAM symbols are multiplexed through the N transmit antennas $209_1$-$209_{Nt}$ in a round-robin fashion and OFDM transmission is applied over each antenna using IFFT modules $208_1$-$208_{Nt}$. For convenience, for purposes herein, $s_k[n]$, the QAM symbol transmitted by antenna k on tone n, and via $b_k^l[n]$ the lth out of the B bits is used as input in one of mapper modems $207_1$-$207_{Nt}$ to produce $s_k[n]$. Letting $b_k[n]=[b_k^1[n], b_k^2[n], \ldots, b_k^B[n]]$, the $$s_k[n]=\text{map}(b_k[n]) \quad (1)$$

where map denotes the mapper operation. FIGS. 5A and 5B show two such representative mappings for B=4. FIG. 5A illustrates one embodiment of a so called set partition type mapper for 16 QAM for use in iterative decoding. This type of mapper is sometimes suitable for BICM with iterative decoding (ID) in contrast to the Gray mapper which is always suitable for a non-iterative decoding process, and is shown in FIG. 5B.

FIG. 3 is a block diagram of one embodiment of a receiver having an iterative decoder for the space-time code for the OFDM system. Referring to FIG. 3, receiver 300 comprises receive antennas $301_1$-$301_{Nr}$, fast Fourier transform (FFT) modules $302_1$-$302_{Nr}$, demodulator/detector 303, parallel-to-serial converter 307, bit deinterleaver 308, maximum a posteriori (MAP) decoder 309, bit interleaver 310, and serial-to-parallel converter 311. Although not shown, each of the FFT modules $302_1$-$302_{Nr}$ is preceded by front end that performs filtering, sampling, and a circular-prefix-removal operation.

For a wideband system, receiver 300 performs OFDM demodulation for each of receive antennas $301_1$-$301_{Nr}$, and the demodulation and demapping is performed over F parallel subchannels. The ith receive antenna $301(i)$ senses a signal made up of various contributions of the signals transmitted from the $N_t$ transmit antennas (i.e., contributions of the multiple F parallel, narrowband, flat fading subchannels transmitted over corresponding antennas $209_1$-$209_{Nt}$ of FIG. 2). Each of FFT modules $302_1$-$302_{Nr}$ apply an F-point FFT to the corresponding signals of receive antennas $301_1$-$301_{Nr}$, generating $N_r$ parallel sets of F subchannels.

In one embodiment, demodulator/detector 303 estimates bits in each of the F subchannels. Multi-input multi-output (MIMO) demapper 305, based on the $N_r$ parallel sets of F subchannels from FFT modules $302_1$-$302_{Nr}$ produces soft estimates of the demapped bits (i.e., bits mapped from the constellation symbol) in each of the F subchannels from the $N_t$ antennas in the transmitter. MIMO demapper 305 produces the estimates of the demapped bits and reliability information about these bits using reliability information generated by soft-output decoding (followed by reinterleaving) by MAP decoder 309.

In one embodiment, MIMO demapper 305 computes hard values (i.e., 0/1 estimates) for the bits transmitted on the overlapping F subchannels, along with an estimate (approximation) of the a posteriori probability of the hard value being correct. FIG. 4 is a block diagram of one embodiment of MIMO demapper 305 having MIMO joint demapper units for the different OFDM tones/subchannels. Referring to FIG. 4, each signal of the $N_r$ receive antennas $301_1$-$301_{Nr}$ is divided into F subchannels (via demodulator 304, not shown in FIG. 4) by applying an FFT operation and sending its output to corresponding subchannel MIMO demappers $401_1$-$401_F$. The signal outputs of the kth subchannel for all $N_r$ receive antennas are provided to the kth subchannel MIMO demapper $401(k)$. After the first iteration reliability information is provided to the kth subchannel MIMO demapper $401(k)$, using extrinsic information generated by the output of MAP decoder 309 at the previous iteration. The extrinsic information is exchanged between MIMO demapper 305 and MAP decoder 309 to improve the bit error rate performance at each iteration. Methods for computing the extrinsic information in such inner/outer decoder settings are well-known in the art. In the first iteration, there is no extrinsic information input to the soft demapper. In subsequent iterations, in one embodiment, the extrinsic information is computed as follows. First, the soft-output is computed by the MAP outer decoder, and from it the input reliability information (input to the same outer decoder) is subtracted off in order to compute the extrinsic information produced by MAP decoder 309. This extrinsic information is deinterleaved and passed as input to MIMO demapper 305 in the next iteration.

Returning to FIG. 3, the estimates of bits in F parallel streams from MIMO demapper 305 together with reliability values for those bits are provided to parallel-to-serial converter 307 along with the extrinsic reliability information on each one of these bits. The reliability information is computed as the difference between the output reliability values for those bits (produced by demapper 305) and the input reliability values for those bits (inputs to demapper 305). The converter 307 reconstitutes the estimate of the BICM encoded bit stream generated by the transmitter, which was estimated by the receiver 300. The estimated BICM encoded bit stream (and the extrinsic reliability information) is then deinterleaved by bit deinterleaver 308 and applied to MAP decoder 309 to reverse the convolutional encoding applied by the transmitter. The reverse operation in this case corresponds to generating estimates of the bit values of the information bit stream that is the input to convolutional coder 201, and also producing extrinsic information that is to be passed back (after reinterleaving) to MIMO demapper 303 as new reliability information.

In one embodiment, the MAP decoding process generates soft output values for the transmitted information bits in a manner that is well known in the art.

The extrinsic information from MAP decoder 309 is first applied to bit interleaver 310. Bit interleaving aligns elements of the extrinsic information with the interleaved estimated BICM encoded bitstream from MIMO demapper 305. In addition, the interleaved extrinsic information is applied to serial-to-parallel converter 311, which forms $N_t$ parallel streams of extrinsic information corresponding to the parallel bit streams formed at the transmitter. The extrinsic information is exchanged between MIMO joint demapper 305 and MAP decoder 309 to improve the bit error rate performance at each iteration. In one embodiment, a MaxLogMAP-type approximation is used by the outer decoder to compute bit-LLR values for each bit location. In another embodiment, an improved Max-Log approximation for calculation of LLRs can be used in MAP decoder 309 associated with the convolutional code used as an outer encoder in the transmission scheme. The improved Max-Log approximation for calculation of a posteriori LLR values may employ a max* term relationship as described above when calculating updated forward recursive, reverse recursive, and branch metrics sequences to calculate the LLR. Each constituent MIMO demapper 305 or MAP decoder 309 thus calculates the max* term by separate calculation of a max term (max(x,y)) and a logarithmic correction term ($\log(1+e^{-|x-y|})$).

An Example of an Inner Decoder Structure

After OFDM front-end preprocessing, the samples from each receive antenna and on each tone are passed through an inner/outer soft-in soft-out decoder structure for decoding shown in FIGS. 3 and 4, which are described above. Also as described above, in one embodiment, the outer decoder is an optimal (soft-in soft-out) MAP decoder. The complexity of the near-optimal receivers associated with these types of coded OFDM/BICM/OFDM systems resides in the inner decoder of the receiver structure in FIG. 3. The received signal sample on the mth receive antenna and the nth tone can be expressed as $$y_m[n] = \sum_k h_{km}[n] s_k[n] + w_m[n] \quad (2)$$

where $h_{mk}[n]$ denotes the effective channel gain between the kth transmit and the mth receive antenna on the nth tone, $w_m[n]$ denotes the associated thermal noise term on the mth antenna and nth tone. Alternatively, (2) can be compactly re-expressed as follows, $$y[n] = H[n]s[n] + w[n] \quad (3)$$

where $h[n]=[h_1[n]\ h_2[n]\ \ldots\ h_N[n]]^T$ with $h_m[n]=[h_{m1}[n] h_{2m}[n] \ldots h_{Nm}[n]]^T$, and where $s[n]=[s_1[n] s_2[n] \ldots s_N[n]]^T$, and $y[n]$ and $w[n]$ are similarly defined and where it is assumed that $N_t=N_r=N$.

In one embodiment, the channel state information (CSI) is not available at the transmitter, but CSI is fully available at the receiver; that is, the set of H[n]'s is known at the receiver but not at the transmitter.

On each OFDM tone, N QAM symbols are transmitted simultaneously and each of the N receive antennas receives a linear combination of these N symbols (whereby the linear combination is dictated by the instantaneous channel coefficients).

As stated above, in one embodiment, the receiver uses a version of the soft output M-algorithm (SOMA) that employs modified survivor selection criteria in the M-algorithm search. In one embodiment, the joint demapper uses the modified SOMA for finding the best alternative among an exponentially growing population of candidates by doing a reduced search in a detection tree. This is done by expanding only the M best alternatives from every level of the tree and one or more alternatives, rather than all alternatives. In one embodiment, the M best alternatives are determined using a metric and another criterion besides the metric. In one embodiment, the metric is so called MaxLogMAP type metric, such as described in Lin & Costello, "Error Control Coding, $2^{nd}$ Edition," Prentice Hall, New York, 2003, which is well-known in the art.

Based on the search through the detection tree, the joint demapper calculates soft output values by comparing the estimated best path (the best visited path) with the longest opposite decision path visited (the best visited path with a different decision on the given bit from that of the best visited full-length path). These paths through the levels of the tree could be terminated at the end of the tree (there are M such paths) or non-terminated at every level (there are T early-terminated paths).

The soft output values from the inner SOMA-based MIMO joint demapper are then used by the soft in soft out (SISO) decoder for the outer binary code. This decoder in turn feeds soft values back to the inner decoder in an iterative turbo-type iterative decoding. In another embodiment, a soft-input hard-output Viterbi decoder (i.e., a simpler outer decoder) uses the soft output values from the inner SOMA-based MIMO joint demapper to produce hard output data for non-iterative decoding.

In one embodiment, the parameters in the SOMA-based inner decoder are channel-adaptive. Such channel-adaptive versions of SOMA inner decoders save in complexity (with respect to the base SOMA designs) without appreciable reduction in performance, as well as being optimizable for a given channel realization to a desired target BER performance.

In one embodiment, the SOMA algorithm computes (estimated) symbol decision values and reliability information for the associated bit estimates by first turning the computation above into a computation on a tree and then performing approximate maximization computations by limiting the search through the tree.

Next the focus is on the SOMA operating on a fixed but arbitrary OFDM tone n. For convenience, the dependence of all variables vectors and matrices on the OFDM index, n, has been omitted. In one embodiment, the mapping of the Max-LogMAP demapper computations on a tree structure is based on exploiting the QR-type decompositions of the channel matrix is described. Let $\pi:\{1,\ldots,N\}:\{1,\ldots,N\}$ denote a permutation function, $s^{(\pi)}=[s_{\pi(1)} s_{\pi(2)} \ldots s_{\pi(N)}]^T$ denote the associated N-symbol permutation of s, and $P^{(\pi)}$ denote the associated permutation matrix, i.e., the matrix yielding $s^{(\pi)}=P^\pi s$.

Associated with any fixed order $\pi$, the decomposition expresses the channel matrix H from equation (3) as $H^{(\pi)}=H[P^{(\pi)}]^T$ in the form $H^{(\pi)}=Q^{(\pi)}L^{(\pi)}$ with $Q^{(\pi)}$ unitary and $L^{(\pi)}$ lower triangular. As a result, the information lossless projection operation of y onto $[Q^{(\pi)}]^H$ yields a vector $\tilde{y}$ that constitutes a set of measurements that are equivalent to those in y from equation (3) and which can be represented as follows $$\tilde{y} = L^{(\pi)} s^{(\pi)} + \tilde{w}. \quad (4)$$

whereby $l_{ij}^{(\pi)} = \{L^\pi\} i, j$, and $l_{ij}^{(\pi)} = 0$ when $i > j$. See FIG. 11 for an example, where the structure of the first term in the right hand side of equation (4) is illustrated for $N_t = N_r = N = 3$.

Given an equation for $\tilde{y}$ given above, the full-search Max-LogMAP can be readily implemented based on the above set of measurements via a search on a tree. At depth k in the tree, only the k first equations are considered from equation (4) to rank candidates. As these equations depend only on the k first symbols in $s^{(\pi)}$, the sets of candidates are ranked in groups whereby each group corresponds to all the N-symbol candidates that have the same symbol values in the first k symbols in the order described by $\pi$. In particular, letting $\tilde{s}$, denote an arbitrary N×1 vector of $2^B$ QAM symbol values, $\tilde{s}_m = [\tilde{s}]_m$, and $\{\tilde{b}_m^1, \tilde{b}_m^2, \ldots \tilde{b}_m^B,\}$ denote the associated values of the kth bits that map to $\tilde{s}_m$, the MaxLogMAP computation reduces to $$L(\tilde{b}_m^k) = \max_{\tilde{s}: \tilde{b}_m^k = 1} \Gamma(\tilde{s}, \hat{s}) - \max_{\tilde{s}: \tilde{b}_m^k = 0} \Gamma(\tilde{s}, \hat{s}) \quad (5)$$

where $\hat{s} = [L^{(\pi)}]^{-1} y$ and $$\Gamma(\tilde{s}, \hat{s}) = \sum_{m=1}^{N} \left\| l_{mm}^{(\pi)} (\tilde{s}_m - \hat{s}_m) + \sum_{n=1}^{m-1} l_{mn}^{(\pi)} (\tilde{s}_n - \hat{s}_n) \right\|^2 \quad (6)$$

The quantities $\Gamma(\tilde{s},\hat{s})$ can be readily implemented recursively via a full tree-search on a tree of depth N and $2^B$ branches per node.

The conventional SOMA algorithm, in essence, obtains soft-output that approximates the MaxLogMAP-metric via an M-algorithm based search on the tree. Like any M-algorithm, from all surviving candidates at any given level, all possible candidates are expanded to the next level ($2^B M$ in this case), but only a subset M of those is kept for search at higher depths in the tree. An important element of the SOMA is that it recursively generates and updates quality metric estimates for each value of each of the NB bits represented on the tree. In particular, it exploits the use of two N×B matrices $\Delta^{(0)}$ and $\Delta^{(1)}$, whereby the relative reliability metrics associated with the values 0 and the 1 of the kth bit in $s_m$ are given by $\delta^{(0)}_{m,k} = [\Delta^{(0)}]_{m,k}$ and $\delta^{(1)}_{m,k} = [\Delta^{(1)}]_{m,k}$, respectively. The scheme relies on recursively extending each surviving path at level m to its $2^B$ path extensions at the next level, computing the cumulative metrics for the new paths and sorting the paths in the order of decreasing metrics. If $p_{[l,i],r}$ denote the rth ranked path at depth I, then the M top paths, i.e., the paths in the set $\{p_{[l,i],r}; 1 \le r \le M\}$ are retained, while the paths in $\{p_{[l,i],r}; r > M\}$ are terminated.

In contrast, in the modified SOMA, the survivors are selected based on additional criteria and not just the metric; that is, some of the best M paths are discarded and some other paths are kept in their place. This selection is based on soft-output type criteria as described above. Therefore, in the case of the modified SOMA, $p_{[l,i],r}$ denotes the rth survivor path at depth I, for r between 1 and M, and denotes the (r-M)th best rejected path for r greater than M".

However, a subset of the best $N_{term}$ terminated paths $\{p_{[l,i],r}; M+1 \le r \le M+N_{term}\}$ are still used before they are discarded for producing relative reliability updates for the bits and bit values they represent by updating the associated locations in $[\Delta^{(0)}]$ and $[\Delta^{(1)}]$ (note that T and $N_{term}$ are used interchangeably to denote the number of terminated paths). After the completion at depth N, the SOMA first chooses the surviving length-N path with the best accumulated metric as the hard estimate. This N×1 vector of QAM symbol estimates is used to directly demap and obtain hard estimates for the NB bits $\{\tilde{b}_m^k; 1 \le k \le B, 1 \le m \le N\}$. Reliability metrics are updated in the two matrices based on all length N tree candidates $2 \le r \le M = N_{term}$. Then the relative reliability information for the kth bit represented in the mth QAM symbol is given by $$L(\tilde{b}_m^k) = [2\tilde{b}_m^k - 1] \delta_{m,k}^{(1-\tilde{b}_m^k)} \quad (7)$$

The values of M (surviving candidates per depth) and N-term (the number of candidates used for gathering soft information based on early terminated paths) can be varied to trade off computation complexity with bit-error-rate performance. In the iterative decoding setting, in each iteration cycle, each decoder computes extrinsic information that is passed as input (appropriately deinterleaved in the case of the MIMO demapper, and reinterleaved in the case of the outer MAP decoder) to the other decoder. The extrinsic information is computed as the difference between the soft output information produced by the decoder (e.g., in the case of MIMO demapper see equation (7)), and the input intrinsic information to the decoder. Typically, the extrinsic information passed between decoders for any given particular bit location is in the form of differential values, that is the difference between the "bit=1" value and the "bit=0" reliability value. In one embodiment, if iterative decoding is used, the metric used for SOMA decoding shown in equation (6) is modified to include an extrinsic term. In particular, another term is added to the right hand side of equation (6), which is a sum of terms, one term for each bit location in the binary representation of the symbol $\tilde{s}$. When differential reliability values are employed, the term added that corresponds to any given, but fixed, bit location, equals zero if the bit-value of that bit location in $\tilde{s}$ is 0, and equal to the differential input reliability value otherwise.

The MIMO demapper receives $y_1$ and $y_2$ signals and returns estimates of the bits represented by the symbols $s_1$ and $s_2$, for one subtone and reliability (soft) information on each bit representing each of the symbols $s_1$ and $s_2$. That is, soft-output (reliability information) is provided on the set of estimated bits.

After the QR-decomposition, two scalar measurements are obtained in the form described in equation (4). For illustration purposes, consider the permutation order $\pi$ corresponding to the order $s_1, s_2$. Due to the structure of the $L^\pi$ matrix in (4), the first measurement in $\tilde{y}$ only depends on $s_1$ while the second depends on both $s_1$ and $s_2$. Next, the metric in equation (6) is considered, which in this case is a sum of two terms. The first term (m=1) is the term due to the first measurement in $\tilde{y}$ and only depends on $s_1$. The second term (m=N=2) is term due to the second measurement (and consists of an $l_{12}$ and an $l_{22}$ term). This structure allows the computation of each of the metrics in (6) to be performed on a tree. At the first level of the tree only the first terms (m=1) in the sums in (6) are computed. Since these depend only on $s_1$ the number of terms computed (and thus number of level-1 nodes in the tree) equals the number of possible values $s_1$ can take. In the second step, from each node at level one (each corresponding to a distinct value of $s_1$), leafs for each possible value of $s_2$ are extended, and the second term (branch metric) in the sum in equation (6) is computed and added to $1^{st}$ term corresponding to the particular value of $s_1$. In the end (level 2 in this case), there are as many end nodes as there are candidate vectors of symbols, and each node represents a computation of (6) for a specific vector symbol candidate. Those can thus be compared as in (5) to provide bit estimates and reliability information for all the bits represented by the QAM symbol vector.

Figure 6:
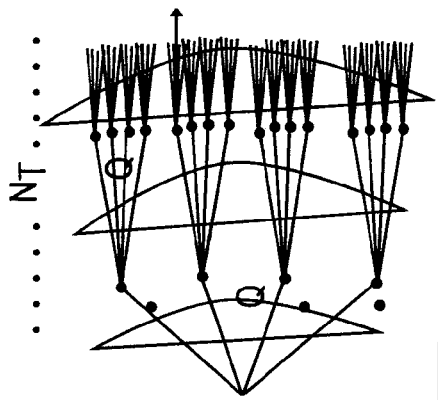
FIG. 6 illustrates the decision tree that allows a recursive computation of metrics on a tree in the case that there are three transmit antennas.
Figure 7:
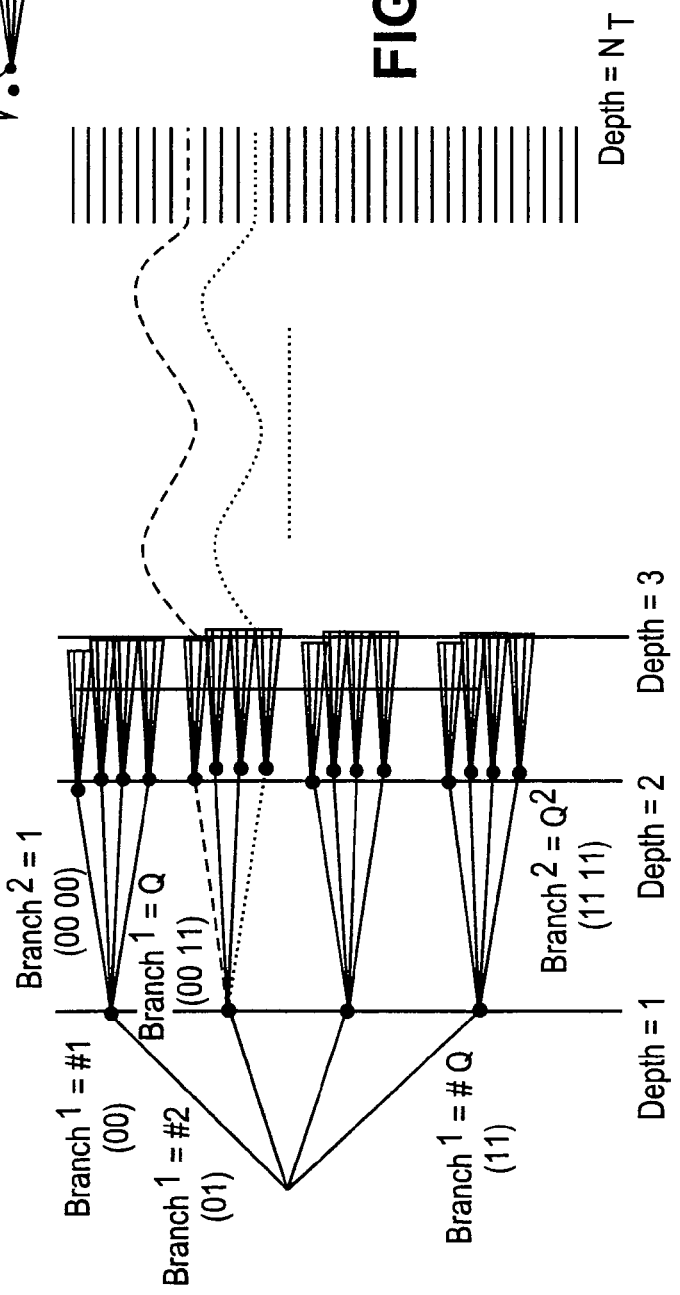
FIG. 7 illustrates an example of a decision tree.

FIG. 6 illustrates the decision tree that allows this recursive computation of metrics on a tree in the case that there are three transmit antennas and thus $N_t=N_r=N=3$. The SOMA algorithm does not search the full tree, but rather a limited set of paths. The way the paths are limited is to start expanding paths from the root of the tree and at each level keeping only a subset of the paths as surviving paths (i.e., as paths that will be further extended). Referring to FIG. 6, at each new level of the tree, a decision is made to expand the tree for only the M best branches and a subset of other branches as described in more detail above. This decision can be based, at least in part, by calculating the partial distance metric for each candidate. Specifically, at level "n", the distance metric used for comparisons corresponds to the first "n" terms of equation (6) (i.e., the sum of all terms in equation (6) for m=1, 2, . . . , "n"). Then based on this metric the best M metrics are selected as survivors. Thus, the tree is pruned at each depth by keeping the best M paths, as well as other additional candidates. This is represented in FIG. 7.

More specifically with respect to searching the tree, the SOMA operates its search on a tree that is associated with a specific symbol order. The full tree without pruning represents all possible combinations of sequences of QAM symbols where the length of the sequences (or the depth of the tree) is equal to the number of transmit antennas. Let Q denote the number of possible values of a single QAM symbol ($Q=2^B$). At depth one in the tree, there are Q candidates each corresponding to the Q values associated with "so-called" ordered $1^{st}$ symbol. At the next depth, Q candidates are expanded from each of the candidates of level 1, each candidate corresponding to the Q values associated with "so-called" ordered $2^{nd}$ QAM symbol, and so on, until level N, in which case all symbol values for all N transmitted QAM symbols (on the given OFDM tone) have been represented. For example, for a 6×6 MIMO antenna system with 64 QAM, the length of the sequences is 6 QAM symbols. The SOMA prunes the tree in decoding and only searches the most promising part of the tree according to a metric at each level.

When applying SOMA on a specific OFDM tone, there are N measurements (as many as there are receive and transmit antennas) and N QAM symbols that need to be resolved (these are the symbols transmitted on this OFDM tone over the N transmit antennas). In one embodiment, in order to apply the SOMA on a tree representing a specific symbol order, a preprocessing technique is applied on the N measurements, which is based on the well-known QR decomposition (performed by a QR decomposition front end of the joint demapper). The N-dimensional column vector representing all N measurements is projected to a unitary transformation. Specifically, the vector is left-multiplied by a matrix A that has dimensions N rows by N columns, and satisfies $AA^H=I$, where I is the identity matrix and the superscript "$H$" represents the transposition and element-wise conjugation operation. Any such unitary transformation of the measurements is invertible and therefore information preserving. As a result, the new processed N measurements, i.e., the result of the left multiplication of the original measurements, are information preserving. When the unitary matrix A is chosen based on the QR decomposition of the channel matrix, the resulting processed measurements have the following property: the first measurement only depends on the $1^{st}$ ordered symbol; the $2^{nd}$ measurement only depends on the $1^{st}$ and the $2^{nd}$ ordered symbols; the kth measurement depends only the first k ordered symbols. These processed measurements are then used to implement the SOMA algorithm on a tree with the specific symbol order. Note that to operate the SOMA on a tree formed by a different symbol order, a different unitary matrix A should be used. The new unitary transformation would then generate a different set of processed measurements, so that the kth measurement only depends on the k first symbols in the new symbol order.

In one embodiment, the decoding tree is organized based on reordering the symbols according to their received energy levels, or signal to noise ratio levels. In one embodiment, these received signal or SNR levels are estimated from the channel state information at the receiver, and potentially taking into account extrinsic information provided by the outer decoder. To compute the received symbol energy associated with the kth symbol (i.e., the QAM symbol transmitted by the kth transmit antenna), the receiver computes the total received channel-coefficient energy from the kth transmit antenna to all receive antennas. The symbol corresponding to the highest received energy level is placed at the root of the tree and is processed first in the decoding algorithm. The second symbol in the tree is ordered such that it has the second highest received energy level. The remaining symbols are selected according to decreasing received energy level values. This ranking yields better detection efficiency. Then, following the required QR decomposition, the modified SOMA in its simplest form can be operated with a fixed value of M (or M' and M"), as well as fixed T and I parameters. In another embodiment, the signal energies of the symbols that are relevant during the tree search are instead used for ordering. First, all symbols are tested as the first symbols in the tree order and the symbol with the highest signal energy on the first-level tree is chosen. Then all remaining symbols are considered as the second symbol in the order, and the symbol with the highest signal level on the second level on the tree is chosen as the second symbol in the order. The process continues until all symbols have been ordered. In one embodiment, the signal energy on the tree of each of the symbols tested can be computed as follows. Assuming a symbol is considered as the "m"th ordered symbol at level m on the tree (after symbols 1, 2, . . . , m−1 in the order have already been selected). An order π is chosen, whereby the first m symbols are the given ordered symbols and where an arbitrary order is placed on the remaining symbols. Then the QR decomposition for that symbol order is performed and an equation of the form (4) is obtained. Then the magnitude of the "m"-th entry on the main diagonal of the matrix $L^\pi$ in Equation (4) denotes the signal-level on the "m"-th symbol in the tree. Note that only the magnitude of the "m"-th entry on the main diagonal is needed, and the value of that entry can be computed in computationally efficient manner, without performing the full QR decomposition. Specifically, consider selecting the "m"-th ordered symbol. In the described embodiment, the first m−1 symbols in the order have already been selected and all remaining symbols are compared as the "m"-th symbol in the order. For each of these symbols, a QR decomposition is made for a (symbol-specific) order π, according to which the first m−1 symbols are the already chosen symbols, the "m"-th symbol is the symbol in comparison, and the rest of the order is arbitrary. Consider a fixed but arbitrary row among the first m−1 rows of the matrix A in the QR decomposition. Any such row of the matrix A is the same for each of these QR decompositions that test symbols as the m-th ordered symbols. Also, only the "m"-th row of the A matrix associated with any such order π needs to be determined, in order to obtain the required SNR information, i.e., in order to obtain the "m"-th element along the main diagonal of the matrix $L^\pi$ in Eqn. (4). This can be computed quite efficiently in a manner well known in the art.

Note that, as described above, the symbol ordering for setting up the SOMA search tree is conducted on a per-tone basis, i.e., the ordering is performed independently for every tone in the OFDM system. In principle, however, this is not required. In another embodiment, other block-reordering schemes are used in which the same tree-search order is chosen for a block of tones by comparisons of the received symbol levels over the given block of tones.

The tree-search symbol reordering technique has a number of advantages. One advantage is that it provides a method for a high performing inner joint demapper with soft output, with an overall complexity that makes it implementable in an iterative decoding setting. Furthermore, tree ordering requires minimal additional complexity, and can yield improved performance for the same complexity, or allow achieving the same bit-error-rate performance with lower receiver complexity.

The SOMA detection process also calculates the soft (reliability) information on each bit, besides choosing the best path as described herein.

Figure 8:
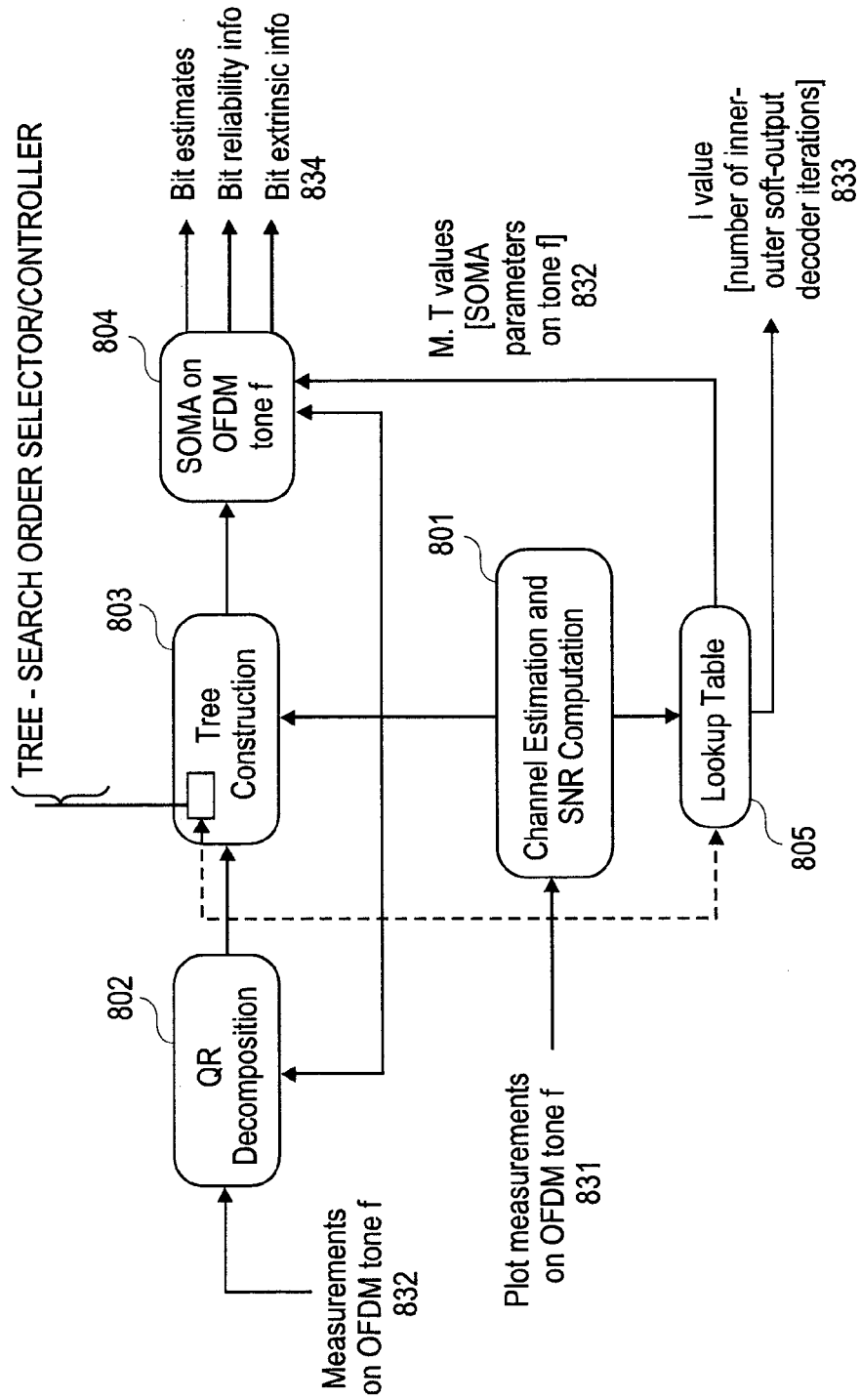
FIG. 8 is a flow diagram of one embodiment of a process for setting up the SOMA inner decoding operation on a tone.

FIG. 8 is a flow diagram of one embodiment of a process for setting up the SOMA inner decoding operation on tone f. The process is performed by processing logic that may comprise hardware (e.g., circuitry, dedicated logic, etc.), software (such as is run on a general purpose computer system or a dedicated machine), or a combination of both. The process is performed on each tone.

Referring to FIG. 8, first channel measurements are used (based on pilot signals) to estimate the channels between all transmit-receive antenna pairs on any given tone f (this would correspond to estimating the channel matrix H[f]) (801). The channel estimation and SNR computation are based on pilot measurements on OFDM tone f (831). The channel estimates and lookup table (LUT) 805 are used to set up the adaptivity (e.g., changing the tree-search symbol order, changing M', M", T of the I, etc.) of SOMA.

More specifically, these measurements are used to set up the QR-decomposition of the channel matrix, set up the SOMA detection tree (803) using tree-search symbol order selector/controller 850 (optional), and select (e.g., by use of a lookup table) the parameters of the SOMA algorithm (804). As the flow diagram reveals, the selection of these parameters depends on the channel conditions. Then, once the QR-decomposition (802), detection tree (803), and SOMA parameters have been set (804), the measured data on all receive antennas on tone f (832) are processed through a QR-decomposition (802) to generate a set of effective channel measurements, the tree is constructed (803) and then the SOMA inner detection algorithm is implemented (804).

In one embodiment, the receiver performs a modified soft output M-algorithm (SOMA) that is used with or without a forward-backward tree search. The base SOMA operates only in the forward direction, where at each level the locally best path is recursively estimated and then the bit reliability values are recursively estimated based on the locally best path and taking into account the terminated paths at that level of the tree. As a result, the reliability information for each bit is not necessarily gathered with respect to the full-length path and the associated longest early-terminated path. In one embodiment, the SOMA process is the FB-SOMA, which is a two-pass version of the soft-output M-algorithm that has a forward pass followed by a backward pass. One embodiment of the FB-SOMA is described in U.S. patent application Ser. No. 12/335,409, entitled "Adaptive Forward-Backward Soft Output M-Algorithm Receiver Structures", filed Dec. 15, 2008.

The outputs of the SOMA inner detection algorithm are bit estimates, bit reliability information and bit extrinsic information 834. The hard output is generated thereafter, in a manner well known in the art, based on the best path.

The SOMA may be implemented on OFDM tone f using SOMA parameters on tone f provided by LUT 805. The output of LUT 805 may provide one or more variable values of the SOMA parameters on tone f, namely M, T (832), and the number of inner-outer soft-output decoder iterations, namely I (833). That is, LUT 805 may specify the value of M (when M is adaptive) while the values of T and I are unchanged (non-adaptable), or the value of T (where T is adaptable) while the value of M and I are unchanged (non-adaptable). The same could occur for 2 or more of the values of M, T and I. These values may be changed at different depths/levels of the tree, such that adaptation occurs over different levels. In such a case, adaptation occurs based on tone quality and on depth. In one embodiment, other variations may be used that include adaptive use of M' and M" over different tones. In an alternative embodiment, a LUT is not used and the values are changed in the SOMA algorithm itself. In such a case, in one embodiment, the values are thresholded in the algorithm. For example, if the channel estimate for the tone falls within a first range, a certain value of M is used (e.g., M=8), but if the channel estimate of the tone falls in another range, then a different value of M is used (e.g., M=12). In one embodiment, involving modified SOMAs, for example M' and M", or $M_e$, and even J (the number of terms used in the improved MaxLogMAP soft output approximation) are adapted. These changes in value may also be based on the number of transmit antennas, the rate of the outer binary code, etc. Note that certain values may change based on whether the group of the paths with the best metrics have metrics that are clustered together, such that those in the cluster (more or less than M) or having values within a certain percentage of the worst metric in the cluster (e.g., with 95% of the value of the lowest quality metric in the cluster) are permitted to continue to the next level/depth in the tree. The resulting set of survivors may have cardinality more or less than M. Alternatively, the process may keep as survivor paths, all the paths whose relative metrics are within a certain percentage (e.g., 95%) of the metric of the best path.

Tree search order selector controller 850 and LUT 805 exchange information. For example, tree search order selector controller 850 selects an order but it also specifies a decomposition of the form of equation (4) that is used to set up the tree. The SNR values at level m on the tree are given by the m-th row of the L matrix in equation (4). These SNR values can be also used to choose via the LUT 805 values for e.g., the M parameter at each level of the tree.

Alternative Embodiments

There are a number of alternative embodiments. In one embodiment, the survivor-selection modified SOMA and FB-SOMA algorithms are implemented based on approximate metric values (at least for some of the paths) for calculating and sorting using e.g., the method described in K. Higuchi, et al., "Adaptive selection of surviving symbol replica candidates based on maximum reliability in QRM-MLD for OFCDM MIMO multiplexing", in Proc. Globecom, pp 2480-2486, December 2004. This yields further savings in computational complexity.

In yet another embodiment, the proposed modified versions of the SOMA and the FB-SOMA are combined with the hierarchical tree based SOMA, the H-SOMA, described in Kitty Wong, "The Soft Output M-algorithm and its applications," PhD Thesis, Queens University, Kingston, Canada, August 2006. Described therein is the use of the hierarchical tree can yield significant savings for the base SOMA, in particular, for large QAM constellations, like 64 QAM. The same relative savings are also obtained by the FB-SOMA on the hierarchical tree.

In U.S. Ser. No. 12/121,649, entitled "Adaptive Soft Output M-Algorithm Receiver Structures for MIMO/OFDM/QAM Systems with BICM/ID", filed May 15, 2008, alternative methods for adaptive SOMA receivers are described, e.g., SOMA algorithms that have variable M in the tree and adapt the M, I, T parameters to the quality of the OFDM tones. Embodiments of the invention can be used independently or optionally be combined with those adaptation methods.

It should also be noted that, in the described form, the symbol ordering for setting up the modified searches on the SOMA and FB-SOMA search tree is conducted on a per-tone basis, i.e., the ordering is performed independently for every tone in the OFDM system. In principle, however, the approach can be generalized to include block-reordering schemes, whereby the same tree-search order is chosen for a block of tones by comparisons of the received symbol levels over the given block of tones, such as described in U.S. Ser. No. 61/031,077, entitled "Tree Position Adaptive Soft Output M-Algorithm Receiver Structures for MIMO/OFDM/QAM Systems with BICM/ID", filed Feb. 25, 2008.

In yet another embodiment, a metric correction term is applied for the soft output algorithm, much the same as the one used in the corrected SOVA algorithm, such as described in, for example, S. Lin and D. J. Costello Jr., "Error Control Coding, $2^{nd}$ Edition", Prentice Hall, New York, 2003.

It should also be pointed out that embodiments of this invention can be combined with the hierarchical tree based on hierarchical QAM constellations as described in Kitty Wong, "The Soft Output M-algorithm and its applications," PhD Thesis, Queens University, Kingston, Canada, August 2006.

Advantages of Embodiments of the Invention

Embodiments of this invention have a number of attractive attributes. One advantage of at least one embodiment is that it provides for a high performing inner joint demapper with soft output, and an overall complexity that makes it implementable in an iterative decoding setting. For example, in one embodiment, survivor selection is modified to allow inclusion of paths in the survivor list, which, although potentially inferior in terms of their path metric value when compared to some of the excluded paths, they allow the collection of more reliable soft-output information for some bits in the information-bearing signal. The calculations are very efficient, especially when approximate metric and sorting calculations are used.

Furthermore, embodiments of the invention can be combined with tree ordering that requires minimal additional complexity, and can yield improved performance for the same complexity, or allow achieving the same bit-error-rate performance with lower receiver complexity. Hierarchical FB-SOMAs can also be used with constructions similar to the hierarchical SOMAs, when mappers with the multilevel bit property are employed.

Other advantages include the ability to obtain soft-output based on improved MaxLogMAP metrics and reduced size tree-searches.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A receiver for use in a communication system to receive information-bearing signals transmitted from a transmitter, the receiver comprising: an inner decoder structure having a multiple-in multiple-out (MIMO) joint demapper to perform joint inner demapping over each tone, the joint demapper being operable to apply a soft-output M-algorithm (SOMA) to identify survivor candidates at each depth in a detection tree being searched for each tone, including surviving full-length candidates, based on at least one metric and at least one other criterion, wherein the at least one other criterion changes based on selection of survivor candidates that enables a forward pass through, where a number of best alternatives from every level of the tree are expanded along with one or more alternatives selected meeting the at least one other criterion and where soft-output related information is collected and stored for each bit, and an outer decoder operable with the inner decoder to perform iterative decoding, wherein the outer decoder is one of a group consisting of a maximum a posterior (MAP) decoder, a MaxLogMAP decoder, and a turbo-type decoder, each for an encoder that comprises a binary outer code from a group consisting of a convolutional code, a rate-compatible punctured convolutional (RCPC) code, and a turbo code and a low-density parity-check (LDPC) code, and wherein, in the forward pass through the detection tree, the joint demapper is operable to output a best full-length path visited by the SOMA and compute soft-output calculations, and in a backward pass through parts of the detection tree traversed during the forward pass through, the joint demapper is operable to compute reliability information for all bits with respect to the best full-length path based on information stored at various stages of the forward pass through the detection tree.

2. The receiver defined in claim 1 wherein the joint demapper, at any given tree depth in the SOMA, is operable to order all paths according to their metric, and uses the additional criteria, besides the metric order, to select the survivor paths.

3. The receiver defined in claim 2 wherein the number of times that each bit value at each bit location occurs in the survivor list is also taken into account to select the survivor paths.

4. The receiver defined in claim 2 wherein the joint demapper constructs the survivor list by first adding a number of candidates with the best metrics to the list, and then adding iteratively members in the list based on their relative metrics, as well as the effect their addition to the survivor list would have on the number of bit locations for which all paths in the survivor list agree in value.

5. The receiver defined in claim 2 wherein the joint demapper computes the soft-output information on any bit location based on relative metric differences between same length paths that represent bit combinations that differ in their bit value at the given bit location.

6. The receiver defined in claim 2 wherein the receiver receives information-bearing signals wirelessly transmitted from the transmitter using orthogonal frequency division multiplexing (OFDM) and bit interleaved coded modulation.

7. The receiver defined in claim 2 wherein the joint demapper uses channel information to reorder the symbols in the detection tree, and where the reordering of the symbols in the tree is based on an estimated received symbol energy with the highest symbol energy at a root of the tree, the next highest second and then the remaining symbols according to decreasing energy levels until the end of the tree is reached.

8. The receiver defined in claim 1 wherein the information bearing signals are wirelessly transmitted from the transmitter.

9. The receiver defined in claim 1 wherein the inner demapper is operable to search the detection tree using a tree-search symbol order that is adapted for each tone based on channel state information and extrinsic information from the outer decoder.

10. The receiver defined in claim 9 wherein the channel state information comprises estimated received symbol energy with the symbol with the highest symbol energy being at a root of the tree, the symbol with the next highest energy being next in the tree, and with the remaining symbols being in the tree according to decreasing energy levels.

11. The receiver defined in claim 9 wherein the tree-search symbol order is based on the signal levels or signal-to-noise ratios (SNRs) of the symbols on the tree.

12. The receiver defined in claim 1 wherein the inner demapper is operable to perform the forward pass through that outputs the best full-length path visited by the SOMA along with partial-path metrics, compute an entry for a table for a given bit location representing a depth at which a bit-logarithmic-likelihood ratio (bit-LLR) for that bit location, and an entry per bit location for a table representing an alternative bit-value metric for use in the bit-LLR computation for that bit location.

13. The receiver defined in claim 12 wherein the inner demapper is operable to perform a second pass to obtain bit-LLRs.

14. The receiver defined in claim 1 wherein the joint demapper uses at least one table to track whether all the bit-values for all the bit locations of codewords are included by selecting paths based on whether at least one bit location in a codeword has not already been identified in the at least one table as having been included at least once in previously selected paths.

15. The receiver defined in claim 1 further comprising:
a plurality of antennas; and
a plurality of fast Fourier transform (FFT) modules, each of the plurality of FFT modules coupled to receive signals from one of the plurality of antennas.

16. A method comprising: performing a first decoding operation to produce a first set of output data representing most likely transmitted bit estimation values and information about the reliability of each of these estimates, including performing a detection process over each tone for joint inner demapping, by applying a soft-output M-algorithm (SOMA) to identify survivor candidates at each depth in a detection tree being searched for each tone, including surviving full-length candidates, based on at least one metric and at least one other criterion, wherein the at least one other criterion changes based on selection of survivor candidates that enables a forward pass through, where a number of best alternatives from every level of the tree are expanded along with one or more alternatives selected meeting the at least one other criterion and where soft-output related information is collected and stored for each bit; and calculating a soft output value for each bit by comparing an estimated best path with a longest and best visited path with an opposite decision on the bit, and wherein the method further comprises in the forward pass through the detection tree, outputting, using a joint demapper, a best full-length path visited by the SOMA and computing soft-output calculations, and in a backward pass through parts of the detection tree traversed during the forward pass through, computing, using the joint demapper, reliability information for all bits with respect to the best full-length path based on information stored at various stages of the forward pass through the detection tree.

17. The method defined in claim 16 further comprising, ordering, at any given tree depth in the SOMA, all paths according to their metric, and using the additional criteria, besides the metric order, to select the survivor paths.

18. The method defined in claim 17 wherein a number of times that each bit value at each bit location occurs in the survivor list is also taken into account to select the survivor paths.

19. The method defined in claim 17 further comprising computing the soft-output information on any bit location based on relative metric differences between same-length paths that represent bit combinations that differ in their bit value at the given bit location.

20. The method defined in claim 17 further comprising computing a bit-logarithmic-likelihood ratio (bit-LLR) for any given bit location, using $$\log\left[\frac{\sum_{j=1}^{J} e^{\alpha_j}}{\sum_{j=1}^{J} e^{\beta_j}}\right]$$

where $\alpha 1, \alpha 2, \ldots, \alpha J$ denote the (log-posterior) path metrics of the J best full-length surviving paths that have bit-value 1 at the given bit location and $\beta 1, \beta 2, \ldots, \beta J$ denote the (log-posterior) path metrics of the J best full-length surviving paths that have bit-value 0 at the given bit location for some integer J greater than one.

21. The method defined in claim 17 further comprising computing reliability information for all bits with respect to the best full-length path, via the backward pass through the tree.

22. The method defined in claim 16 further comprising constructing the survivor list by first adding a number of candidates with the best metrics to the list, and then adding iteratively members in the list based on their relative metrics, as well as the effect their addition to the survivor list would have on the number of bit locations for which all paths in the survivor list agree in value.

23. The method defined in claim 16 using at least one table to track whether all the bit locations of codewords are included in the selected paths by selecting paths based on whether at least one bit location in a codeword has not already been identified in the at least one table as having been included at least one in previously selected paths.

24. The method defined in claim 16 wherein the tree search is a hierarchical tree search.

25. An article of manufacture having one or more non-transitory computer readable storage media storing instructions thereon which, when executed by a system, cause the system to perform a method comprising: performing a first decoding operation to produce a first set of output data representing most likely transmitted bit estimation values and information about reliability of each of these estimates, including performing a detection process over each tone for joint inner demapping, by applying a soft-output M-algorithm (SOMA) to identify survivor candidates at each depth in a detection tree being searched for each tone, including surviving full-length candidates, based on at least one metric and at least one other criterion, wherein the at least one other criterion changes based on selection of survivor candidates that enables a forward pass through, where a number of best alternatives from every level of the tree are expanded along with one or more alternatives selected meeting the at least one other criterion and where soft-output related information is collected and stored for each bit; and calculating a soft output value for each bit by comparing an estimated best path with a longest and best visited path with an opposite decision on the bit, and wherein the method further comprises in the forward pass through the detection tree, outputting, using a joint demapper, a best full-length path visited by the SOMA and computing soft-output calculations, and in a backward pass through parts of the detection tree traversed during the forward pass through, computing, using the joint demapper, reliability information for all bits with respect to the best full-length path based on information stored at various stages of the forward pass through the detection tree.

* * * * *